(12) United States Patent
Namie

(10) Patent No.: US 11,697,129 B2
(45) Date of Patent: Jul. 11, 2023

(54) CONTROL DEVICE AND NON-TRANSITORY COMPUTER READABLE RECORDING MEDIUM

(71) Applicant: OMRON Corporation, Kyoto (JP)

(72) Inventor: Masaki Namie, Takatsuki (JP)

(73) Assignee: OMRON Corporation, Kyoto (JP)

( * ) Notice: Subject to any disclaimer, the term of this patent is extended or adjusted under 35 U.S.C. 154(b) by 13 days.

(21) Appl. No.: 17/437,035

(22) PCT Filed: Mar. 6, 2020

(86) PCT No.: PCT/JP2020/009713
§ 371 (c)(1),
(2) Date: Sep. 7, 2021

(87) PCT Pub. No.: WO2020/189344
PCT Pub. Date: Sep. 24, 2020

(65) Prior Publication Data
US 2022/0176402 A1 Jun. 9, 2022

(30) Foreign Application Priority Data
Mar. 20, 2019 (JP) .................... 2019-052750

(51) Int. Cl.
*G05B 15/02* (2006.01)
*B05C 5/02* (2006.01)
*B05D 1/26* (2006.01)

(52) U.S. Cl.
CPC ............ *B05C 5/02* (2013.01); *B05D 1/265* (2013.01); *G05B 15/02* (2013.01)

(58) Field of Classification Search
None
See application file for complete search history.

(56) References Cited

U.S. PATENT DOCUMENTS

| 6,256,597 B1 | 7/2001 | Wang et al. | |
| 2018/0264647 A1* | 9/2018 | Sato | ........... B25J 9/1653 |

FOREIGN PATENT DOCUMENTS

| EP | 3432102 | 1/2019 |
| JP | 2004298697 | 10/2004 |

(Continued)

OTHER PUBLICATIONS

English translation for JP2004298697.*

(Continued)

*Primary Examiner* — Charles Capozzi
(74) *Attorney, Agent, or Firm* — JCIPRNET

(57) ABSTRACT

A control device includes: a first generator generating a first command position of a control object on a plane in each control cycle based on a target trajectory; a first control part generating a first operation amount by model predictive control using a first dynamic characteristic model and the first command position; a second generator generating a second command position of the control object on an orthogonal axis in each control cycle; and a second control part generating a second operation amount by model predictive control using a second dynamic characteristic model and the second command position. Based on shape data indicating a surface shape of an object and the first command position, the second generator generates the second command position so that a distance between the control object and a surface of the object is constant.

6 Claims, 19 Drawing Sheets

(56) References Cited

FOREIGN PATENT DOCUMENTS

| JP | 2005138013 | 6/2005 |
|----|------------|--------|
| JP | 2007152261 | 6/2007 |
| JP | 2018151889 | 9/2018 |
| WO | 2015181918 | 12/2015 |

OTHER PUBLICATIONS

English translation for JP2007152261.*
English translation for WO2015181918.*
"International Search Report (Form PCT/ISA/210) of PCT/JP2020/009713," dated Jun. 2, 2020, with English translation thereof, pp. 1-4.
"Written Opinion of the International Searching Authority (Form PCT/ISA/237) of PCT/JP2020/009713," dated Jun. 2, 2020, with English translation thereof, pp. 1-6.
Urbano Nunes et al., "Sensor-based 3-D autonomous contour-following control," Proceedings of IEEE/RSJ/GI International Conference on Intelligent Robots and Systems, vol. 1, Sep. 1994, pp. 172-179.
"Search Report of Europe Counterpart Application", dated Nov. 14, 2022, p. 1-p. 6.
"Office Action of Korea Counterpart Application", dated May 19, 2023, with English translation thereof, p. 1-p. 11.

* cited by examiner

| Data No. | X-axis (horizontal direction) position [mm] | Z-axis (height direction) position [mm] |
|---|---|---|
| 0 | 0 | 0.000000 |
| 1 | 1 | 0.050260 |
| 2 | 2 | 0.100489 |
| 3 | 3 | 0.150654 |
| 4 | 4 | 0.200723 |
| 5 | 5 | 0.250666 |
| ... | ... | ... |
| 498 | 498 | −0.100489 |
| 499 | 499 | −0.050260 |
| 500 | 500 | 0.000000 |
| 501 | 501 | 0.050260 |
| 502 | 502 | 0.100489 |
| ... | ... | ... |
| 998 | 998 | −0.100489 |
| 999 | 999 | −0.050260 |
| 1000 | 1000 | 0.000000 |

FIG. 6

| Data No. | Movement time [ms] | X-axis command position [mm] | Z-axis command position [mm] |
|---|---|---|---|
| 0 | 0 | 0.000000 | 0.000000 |
| 1 | 1 | 0.000010 | 0.000001 |
| 2 | 2 | 0.000080 | 0.000004 |
| 3 | 3 | 0.000269 | 0.000014 |
| 4 | 4 | 0.000636 | 0.000032 |
| 5 | 5 | 0.001241 | 0.000062 |
| ... | ... | ... | ... |
| 498 | 498 | 496.250040 | −0.188204 |
| 499 | 499 | 498.125005 | −0.094210 |
| 500 | 500 | 500.000000 | 0.000000 |
| 501 | 501 | 501.874995 | 0.094210 |
| 502 | 502 | 503.749960 | 0.188204 |
| ... | ... | ... | ... |
| 998 | 998 | 999.999920 | −0.000004 |
| 999 | 999 | 999.999990 | −0.000001 |
| 1000 | 1000 | 1000.000000 | 0.000000 |

```
js = 0
FOR i=0 TO DNC
    FOR j=js TO DNW – 1
        IF X(i) >= WX(j) AND X(i) < WX(j+1)
            Z(i) = WZ(j) + [WZ(j+1) – WZ(j)]/[WX(j+1) – WX(j)] * [X(i) – WX(j)]
            js = j
            BREAK
        END
    END
END
```

FIG. 12

CONTROL DEVICE AND NON-TRANSITORY COMPUTER READABLE RECORDING MEDIUM

CROSS-REFERENCE TO RELATED APPLICATION

This application is a 371 application of the International PCT application serial no. PCT/JP2020/009713, filed on Mar. 6, 2020, which claims the priority benefit of Japan Patent Application No. 2019-052750, filed on Mar. 20, 2019. The entirety of each of the above-mentioned patent applications is hereby incorporated by reference herein and made a part of this specification.

TECHNICAL FIELD

The technology relates to a control device and a control program.

RELATED ART

Japanese Laid-open No. 2004-298697 (Patent Document 1) discloses a coating method in which a die head for coating liquid discharging is brought sufficiently close to a substrate even if the substrate has undulations on its surface, and a uniform coating film is formed on the substrate. The coating method includes a process of measuring the shape of the surface of the substrate before coating, and a process of, based on a measurement result of the shape, adjusting a distance between the die head for coating liquid discharging and the substrate and moving the die head for coating liquid discharging in accordance with the shape of the surface of the substrate.

PRIOR-ART DOCUMENTS

Patent Documents

Patent Document 1: Japanese Laid-open No. 2004-298697

SUMMARY OF THE INVENTION

Problems to be Solved by the Invention

In Patent Document 1, the die head for coating liquid discharging is moved up and down in accordance with the shape of the surface of the substrate while the die head for coating liquid discharging is moved in a direction parallel to the substrate. Hence, a mechanism for moving the die head for coating liquid discharging in the direction parallel to the substrate and a mechanism for moving the die head for coating liquid discharging up and down are controlled to be linked with each other.

In the case where such two mechanisms are linked with each other to operate, a difference in control response delay between the two mechanisms becomes a problem. However, Patent Document 1 does not consider the difference in control response delay between the two mechanisms. When there is a difference in control response delay between the two mechanisms, the die head serving as a control object becomes unable to accurately follow the shape of the surface of the substrate serving as an object. Particularly, in the case where the undulations on the surface of the object have a large gradient, or where the control object has a high moving speed, the control object becomes unable to accurately follow the shape of the surface of the object.

The present disclosure has been made in view of the above issues, and an object thereof is to provide a control device and a control program making it possible for a control object to accurately follow the shape of a surface of an object.

Means for Solving the Problems

According to one example of the present disclosure, a control device is connected to multiple drive devices for changing a relative positional relationship between an object and a control object executing a predetermined processing on a surface of the object, and outputs an operation amount to the multiple drive devices every control cycle. The multiple drive devices include: a first drive device, for moving the control object relative to the object along a plane facing the surface of the object; and a second drive device, for moving the control object relative to the object along an orthogonal axis orthogonal to the plane. The control device includes a first generator, a first control part, a second generator, and a second control part. The first generator generates a first command position of the control object on the plane in each control cycle based on a target trajectory. The first control part generates a first operation amount output to the first drive device by model predictive control using a first dynamic characteristic model showing a relationship between the first operation amount and a position of the control object on the plane and the first command position. The second generator generates a second command position of the control object on the orthogonal axis in each control cycle. The second control part generates a second operation amount output to the second drive device by model predictive control using a second dynamic characteristic model showing a relationship between the second operation amount and a position of the control object on the orthogonal axis and the second command position. Based on shape data indicating a surface shape of the object and the first command position, the second generator generates the second command position so that a distance between the control object and the surface of the object is constant.

According to this disclosure, the control object is moved in accordance with an operation amount generated by model predictive control. At this time, the second command position on the above orthogonal axis in each control cycle is generated based on the shape data and the first command position. As a result, the control object is able to accurately follow the shape of the surface of the object.

In the above disclosure, the first drive device moves the control object relative to the object along a first axis on the plane. The first command position indicates a position on the first axis. The first dynamic characteristic model indicates a relationship between the first operation amount and the position of the control object on the first axis. With respect to each of multiple points on a line obtained by projecting the first axis on the surface of the object, the shape data indicate a position on the orthogonal axis of the foot of a perpendicular drawn from the aforementioned point to the orthogonal axis. The second generator selects, from among the multiple points, two points sandwiching a processing object point on the surface of the object to be subjected to the predetermined processing when the control object is located in the first command position. By interpolation calculation using positions of the selected two points on the orthogonal axis, the second generator obtains a position on the orthogonal axis of the foot of a perpendicular drawn from the processing object point to the orthogonal axis, and generates the second command position based on a position of the processing object point on the orthogonal axis.

According to this disclosure, even if the data of the processing object point is not included in the shape data, by interpolation calculation, the position on the above orthogonal axis of the foot of the perpendicular drawn from the processing object point to the orthogonal axis can be obtained. Then, based on the position on the orthogonal axis, the second command position is generated. In this way, the second command position corresponding to the first command position can be easily generated according to the surface shape of the object.

In the above disclosure, the first drive device moves the control object relative to the object along the first axis on the plane. The first command position indicates the position on the first axis. The first dynamic characteristic model indicates the relationship between the first operation amount and the position of the control object on the first axis. With respect to each of multiple points on the line obtained by projecting the first axis on the surface of the object, the shape data indicate the position on the orthogonal axis of the foot of the perpendicular drawn from the aforementioned point to the orthogonal axis. The second generator selects, from among the multiple points, a point closet to the processing object point on the surface of the object to be subjected to the predetermined processing when the control object is located in the first command position, and generates the second command position based on a position of the selected point on the orthogonal axis.

According to this disclosure, the second command position is easily generated by reading the data of the point closest to the processing object point from the shape data. As a result, calculation load of generating the second command position can be suppressed.

In the above disclosure, the first drive device moves the control object relative to the object along the first axis on the plane. The first command position indicates the position on the first axis. The first dynamic characteristic model indicates the relationship between the first operation amount and the position of the control object on the first axis. The multiple drive devices further include a third drive device for moving the control object relative to the object along a second axis on the plane that is different from the first axis. The control device further includes: a third generator, generating a third command position of the control object on the second axis in each control cycle based on the target trajectory; and a third control part, generating a third operation amount output to the third drive device by model predictive control using a third dynamic characteristic model showing a relationship between the third operation amount and the position of the control object on the second axis and the third command position. The second generator generates the second command position based on the third command position in addition to the shape data and the first command position.

According to this disclosure, the control object is able to move to an arbitrary position on the plane facing the surface of the object in accordance with the first command position and the third command position. At this time, the second command position on the above orthogonal axis in each control cycle is generated based on the shape data and the first command position and the third command position. As a result, the control object is able to accurately follow the shape of the surface of the object.

In the above disclosure, with respect to each of multiple points on the surface of the object, the shape data indicate the position on the orthogonal axis of the foot of a perpendicular drawn from the aforementioned point to the orthogonal axis. The second generator selects, from among the multiple points, at least three points located around the processing object point on the surface of the object to be subjected to the predetermined processing when the control object is located in the first command position and the third command position. By interpolation calculation using positions of the selected at least three points on the orthogonal axis, the second generator obtains the position on the orthogonal axis of the foot of the perpendicular drawn from the processing object point to the orthogonal axis, and generates the second command position based on the position of the processing object point on the orthogonal axis.

According to this disclosure, by interpolation calculation, the position on the above orthogonal axis of the foot of the perpendicular drawn from the processing object point to the orthogonal axis can be obtained. Then, based on the position on the orthogonal axis, the second command position is generated. In this way, the second command position corresponding to the first command position and the third command position can be easily generated according to the surface shape of the object.

According to one example of the present disclosure, a control program is a program for realizing a control device, the control device being connected to multiple drive devices for changing a relative positional relationship between an object and a control object executing a predetermined processing on a surface of the object, the control device outputting an operation amount to the multiple drive devices every control cycle. The multiple drive devices include: a first drive device, for moving the control object relative to the object along a plane facing the surface of the object; and a second drive device, for moving the control object relative to the object along an orthogonal axis orthogonal to the plane. The control program causes a computer to execute a first to fourth steps. The first step is a step of generating a first command position of the control object on the plane in each control cycle based on a target trajectory. The second step is a step of generating a first operation amount output to the first drive device by model predictive control using a first dynamic characteristic model showing a relationship between the first operation amount and a position of the control object on the plane and the first command position. The third step is a step of generating a second command position of the control object on the orthogonal axis in each control cycle. The fourth step is a step of generating a second operation amount output to the second drive device by model predictive control using a second dynamic characteristic model showing a relationship between the second operation amount and a position of the control object on the orthogonal axis and the second command position. The third step includes a step of, based on shape data indicating a surface shape of the object and the first command position, generating the second command position so that a distance between the control object and the surface of the object is constant.

According to this disclosure, the control object is also able to accurately follow the shape of the surface of the object.

Effects of the Invention

According to the present disclosure, the control object is able to accurately follow the shape of the surface of the object.

BRIEF DESCRIPTION OF THE DRAWINGS

FIG. 6 illustrates one example of shape data of the surface of the workpiece W.

FIG. 12 illustrates a source code executed in step S2.

DESCRIPTION OF THE EMBODIMENTS

Figure 1:
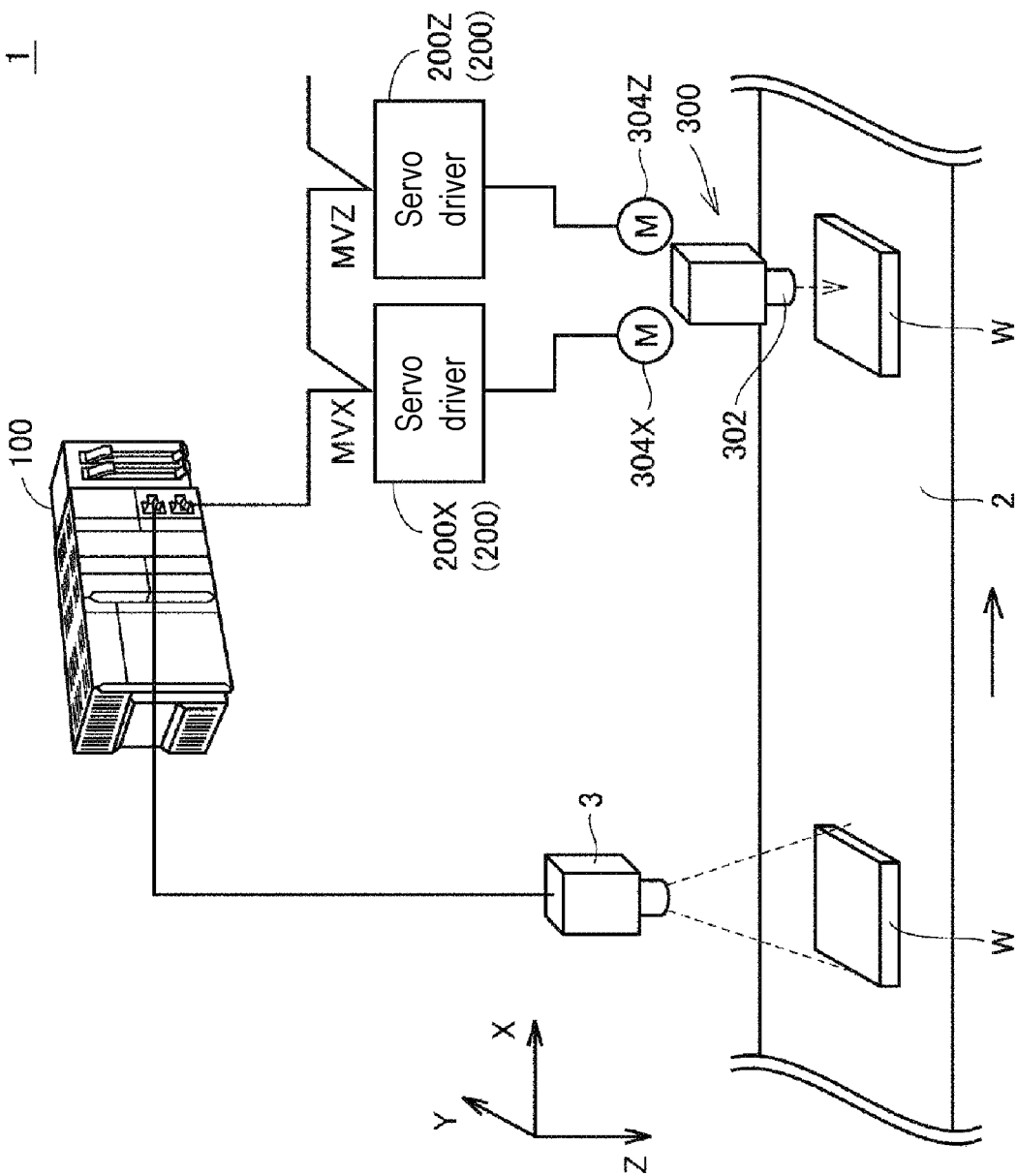
FIG. 1 is a schematic diagram showing a configuration example of a control system in which a control device according to the present embodiment is applied.

Embodiments of the present invention are described in detail with reference to the drawings. Moreover, the same or equivalent parts in the drawings are denoted by the same reference numerals, and descriptions thereof will not be repeated.

§ 1 Application Example

Figure 2:
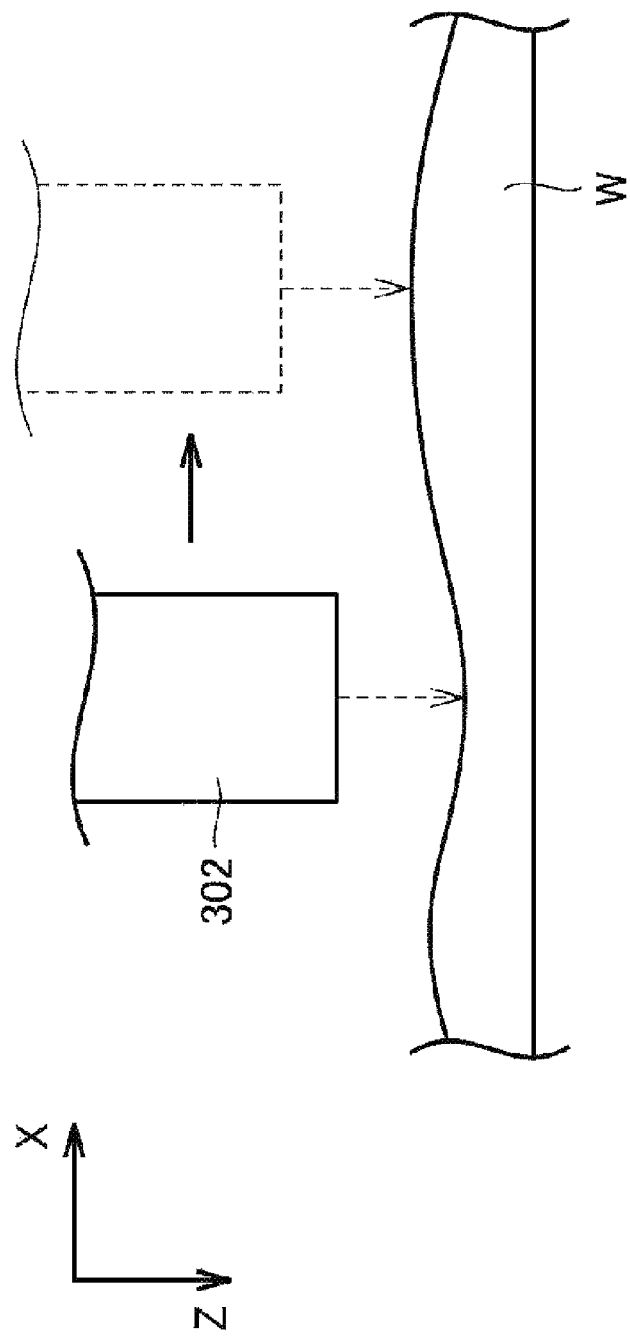
FIG. 2 illustrates an example of movement of a coating device provided in the control system shown in FIG. 1.

First of all, one example of a situation in which the present invention is applied is described with reference to FIG. 1 and FIG. 2. FIG. 1 is a schematic diagram showing a configuration example of a control system in which a control device according to the present embodiment is applied. FIG. 2 illustrates an example of movement of a coating device 300 provided in a control system 1 shown in FIG. 1.

The control system 1 of the example shown in FIG. 1 is a system in which a coating liquid is applied to a surface of an object (hereinafter referred to as "workpiece W"). The control system 1 includes a conveyance device 2 conveying the workpiece W, a shape measurement sensor 3, the coating device 300, multiple servo drivers 200, and a control device 100. However, the control system is not limited to the example shown in FIG. 1, and may be any system in which some processing (such as laser processing and inspection image capturing) is executed on the surface of the workpiece W. In the case of performing laser processing on the surface of the workpiece W, a laser processing machine is provided instead of the coating device 300; in the case of performing inspection image capturing on the surface of the workpiece W, an imaging device is provided instead of the coating device 300. The workpiece W of the example shown in FIG. 1 is a substrate.

Hereinafter, a thickness direction of the workpiece W is taken as a Z-axis direction, and two axes orthogonal to the Z-axis are taken as the X-axis and the Y-axis.

The conveyance device 2 has, for example, a conveyance belt carrying the workpiece W. By driving the conveyance belt, the workpiece W is conveyed in the order of from the shape measurement sensor 3 to the coating device 300. When the workpiece W is located below the shape measurement sensor 3 and the coating device 300, the conveyance device 2 temporarily stops the conveyance of the workpiece W. After shape measurement on the workpiece W by the shape measurement sensor 3 and coating on the workpiece W by the coating device 300 are completed, the conveyance device 2 resumes the conveyance of the workpiece W.

The shape measurement sensor 3 is a sensor measuring the surface shape of the workpiece W, and is composed of, for example, a two-dimensional laser displacement sensor. The shape measurement sensor 3 measures the surface shape for each workpiece W, and transmits shape data obtained by the measurement to the control device 100. The shape measurement sensor 3 measures, for example, a position of the foot of a perpendicular on the Z-axis, the perpendicular being drawn from multiple points on a surface of the workpiece W to the Z-axis. The multiple points on the surface of the workpiece W are located at equal intervals, for example, on a line obtained by projecting the X-axis on the surface of the workpiece W along the Z-axis.

The coating device 300 has a coating head 302, and the coating liquid is applied from the coating head 302 to the surface of the workpiece W. The coating device 300 includes a servomotor 304X for moving the coating head 302 along the X-axis on an XY plane facing the surface of the workpiece W, and a servomotor 304Z for moving the coating head 302 along the Z-axis orthogonal to the XY plane.

The multiple servo drivers 200 are drive devices for changing a relative positional relationship between the workpiece W and the coating head 302, and include servo drivers 200X and 200Z. The servo drivers 200X and 200Z are provided corresponding to the servomotors 304X and 304Z, respectively, and drive the corresponding servomotors. That is, the servo driver 200X drives the servomotor 304X, and moves the coating head 302 along the X-axis on the XY plane facing the surface of the workpiece W. Accordingly, the coating head 302 moves relative to the workpiece W along an X-axis direction. The servo driver 200Z drives the servomotor 304Z, and moves the coating head 302 along the Z-axis orthogonal to the XY plane. Accordingly, the coating head 302 moves relative to the workpiece W along the Z-axis direction.

Based on a command value (command position or command speed) from the control device 100 and a feedback value from the corresponding servomotors, the servo drivers 200X and 200Z generate a drive signal for the corresponding servomotors. By outputting the generated drive signal to the corresponding servomotors, the servo drivers 200X and 200Z drive the corresponding servomotors.

For example, the servo drivers 200X and 200Z receive an output signal as the feedback value from an encoder coupled to a rotary shaft of the corresponding servomotors. From the feedback value, the position, rotation phase, rotational speed, cumulative number of revolutions and the like of the servomotors can be detected.

The control device 100 is connected to and controls the multiple servo drivers 200. Specifically, the control device 100 outputs the operation amounts MVX and MVZ to the servo drivers 200X and 200Z, respectively, and performs movement control to move the coating head 302. Data containing the operation amounts can be exchanged between the control device 100 and the servo drivers 200X and 200Z.

FIG. 1 shows a configuration example in which the control device 100 and the servo drivers 200X and 200Z are communicatively connected via a fieldbus. However, the communication form is not limited to such a configuration example, and any communication form can be adopted if an algorithm as described below is realized. For example, the control device 100 and the servo drivers 200X and 200Z may be directly connected to each other by a signal line.

The control device 100 generates the operation amounts MVX and MVZ to be respectively output to the servo drivers 200X and 200Z, by model predictive control every control cycle. The control device 100 outputs the generated operation amounts MVX and MVZ as command values (command position or command speed) to the servo drivers 200X and 200Z, respectively.

Based on a target trajectory, the control device 100 generates a first command position of the coating head 302 on the X-axis in each control cycle. By model predictive control using a first dynamic characteristic model showing a relationship between the operation amount MVX and the position of the coating head 302 on the X-axis and the first command position, the control device 100 generates the operation amount MVX to be output to the servo driver 200X.

The control device 100 generates a second command position of the coating head 302 on the Z-axis in each control cycle. By model predictive control using a second dynamic characteristic model showing a relationship between the operation amount MVZ and the position of the coating head 302 on the Z-axis and the second command position, the control device 100 generates the operation amount MVZ to be output to the servo driver 200Z.

Based on the shape data measured by the shape measurement sensor 3 and the first command position, the control device 100 generates the second command position so that a distance between the coating head 302 and the surface of the workpiece W is constant.

In this way, the control device 100 performs movement control on the coating head 302 by model predictive control. At this time, the second command position on the Z-axis in each control cycle is generated based on the shape data. As a result, the coating head 302 is able to accurately follow the shape of the surface of the workpiece W, as shown in FIG. 2.

§ 2 Specific Example

Next, a specific example of the control device 100 according to the present embodiment is described.

A. Hardware Configuration Example of Control Device

As one example, the control device 100 according to the present embodiment may be implemented using a programmable controller (PLC). In the control device 100, processing as described later may be realized by a processor executing a pre-stored control program (including a system program and a user program as described later).

Figure 3:
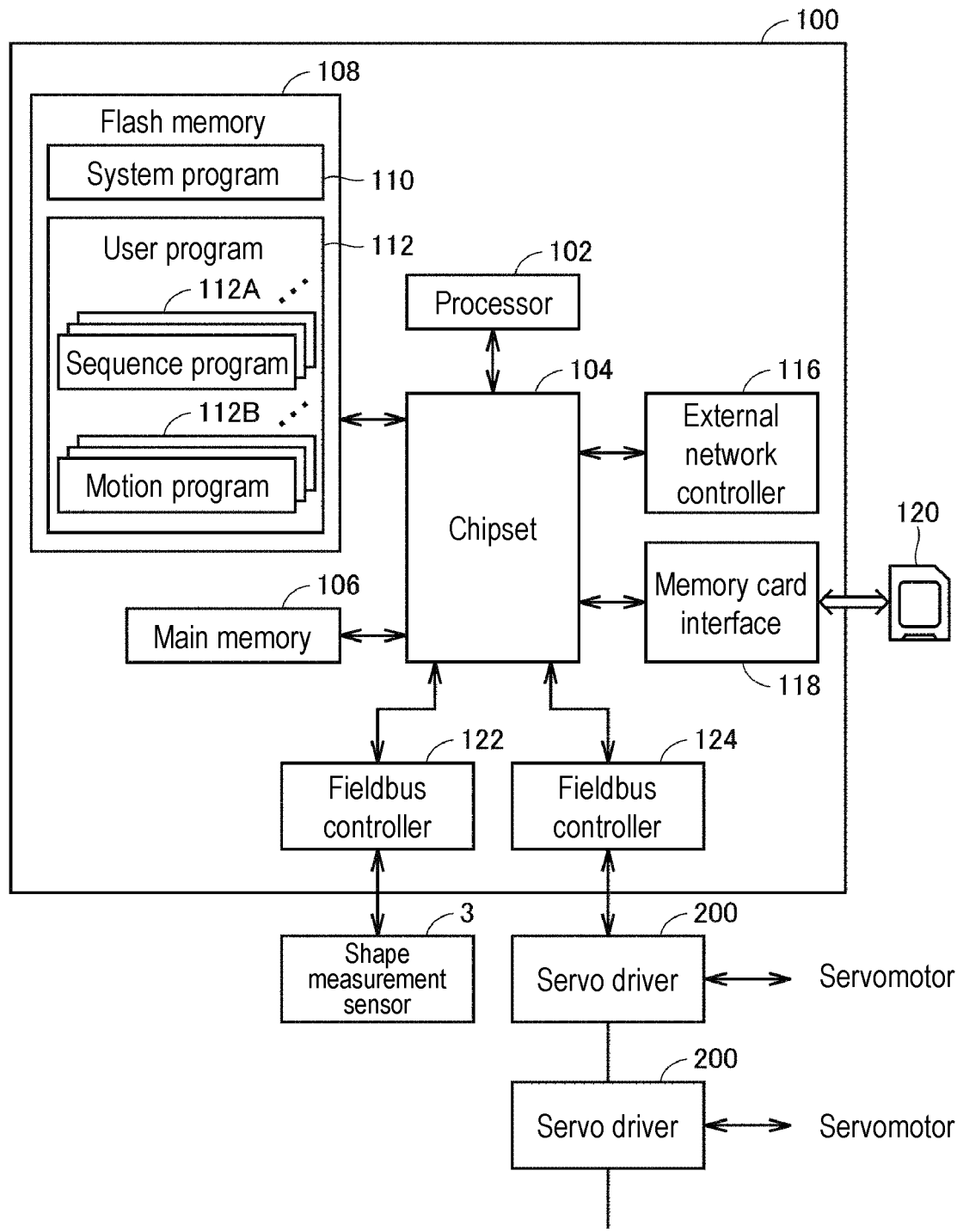
FIG. 3 is a schematic diagram showing one example of a hardware configuration of a control device according to the present embodiment.

FIG. 3 is a schematic diagram showing one example of a hardware configuration of the control device 100 according to the present embodiment. As shown in FIG. 3, the control device 100 includes: a processor 102 such as a central processing unit (CPU) or a microprocessing unit (MPU), a chipset 104, a main memory 106, a flash memory 108, an external network controller 116, a memory card interface 118, and fieldbus controllers 122 and 124.

The processor 102 reads a system program 110 and a user program 112 stored in the flash memory 108, and develops and executes the same on the main memory 106, thereby realizing arbitrary control over a control object. By the processor 102 executing the system program 110 and the user program 112, processing related to output of an operation amount to the servo driver 200, data communication via a fieldbus or the like as described later is executed.

The system program 110 includes an order code for providing basic functions of the control device 100, such as data input/output processing or control of execution timing. The user program 112 is arbitrarily designed according to the control object, and includes a sequence program 112A for executing sequence control and a motion program 112B for executing motion control. In the user program 112, by defining a function block, processing and functions according to the present embodiment are realized. A function block is a component of a program executed by the control device 100, meaning a modularized program element to be used multiple times.

The chipset 104 realizes processing of the control device 100 as a whole by controlling each component.

The fieldbus controller 122 is an interface for data exchange with various devices connected to the control device 100 through a fieldbus. As one example of such devices, the shape measurement sensor 3 is connected to the control device 100. The shape data received from the shape measurement sensor 3 by the fieldbus controller 122 are stored in a storage device such as the flash memory 108.

The fieldbus controller 124 is an interface for data exchange with various devices connected to the control device 100 through a fieldbus. As one example of such devices, the servo driver 200 is connected to the control device 100.

The fieldbus controllers 122 and 124 are capable of giving an arbitrary command to a connected device and acquiring arbitrary data (including a measured value) managed by the device. The fieldbus controller 122 also functions as an interface for data exchange with the shape measurement sensor 3. The fieldbus controller 124 also functions as an interface for data exchange with the servo driver 200.

The external network controller 116 controls data exchange through various wired/wireless networks. The memory card interface 118 is configured to allow a memory card 120 to be mounted thereon and removed therefrom, making it possible to write data to and read data from the memory card 120.

B. Servo Driver

Figure 4:
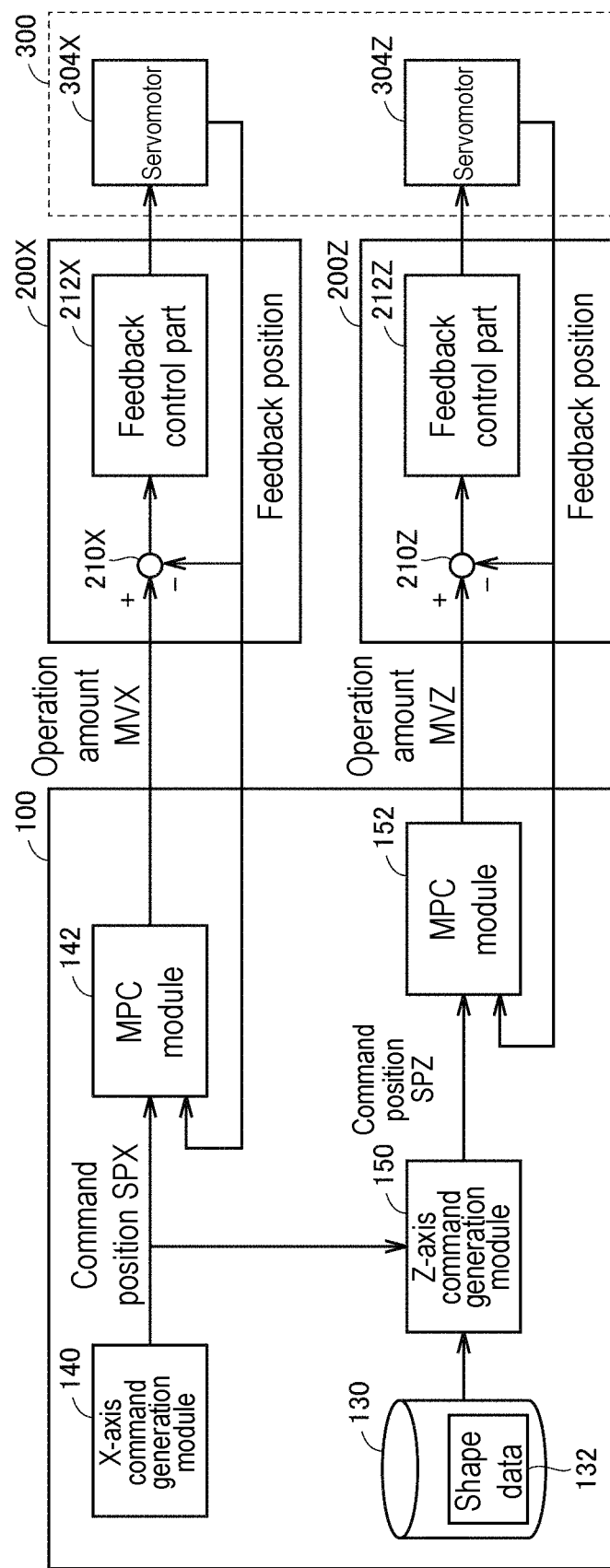
FIG. 4 is a schematic diagram showing one example of a functional configuration of a servo driver and a control device according to the present embodiment.

FIG. 4 is a schematic diagram showing one example of a functional configuration of a servo driver and a control device according to the present embodiment. As shown in FIG. 4, the servo drivers 200X and 200Z respectively include subtractors 210X and 210Z and feedback control parts 212X and 212Z.

The subtractor 210X receives the operation amount MVX as the command value (command position or command speed) from the control device 100, and also receives an output signal as the feedback value from an encoder coupled to the servomotor 304X. Similarly, the subtractor 210Z receives the operation amount MVZ as the command value (command position or command speed) from the control device 100, and also receives an output signal as the feedback value from an encoder coupled to the servomotor 304Z. The subtractors 210X and 210Z calculate a deviation between the command value and the feedback value received.

The feedback control parts 212X and 212Z respectively execute control operations according to the deviation output from the subtractors 210X and 210Z. The feedback control parts 212X and 212Z execute a control operation according to a position control loop and a speed control loop in the case where the operation amount received from the control device 100 is a command position. The feedback control parts 212X and 212Z execute a control operation according to a speed control loop in the case where the operation amount received from the control device 100 is a command speed.

In the control operation according to a position control loop, a command speed corresponding to a position deviation between a measurement position of the servomotor obtained from the feedback value and a command position given by the control device 100 is calculated.

In the control operation according to a speed control loop, a torque value corresponding to a speed deviation between a command speed and a measurement speed of the servomotor obtained from the feedback value is calculated. The feedback control parts 212X and 212Z output to the servomotor a current command for generating torque of the calculated torque value.

C. Functional Configuration Example of Control Device

As shown in FIG. 4, the control device 100 includes a storage 130, an X-axis command generation module 140, a Z-axis command generation module 150, and model predictive control modules 142 and 152. In the figure, model predictive control is referred to as "MPC."

The storage 130 is composed of the flash memory 108 and the main memory 106 shown in FIG. 3, and stores shape data 132 for each workpiece W received from the shape measurement sensor 3.

The X-axis command generation module 140 generates the first command position (hereinafter referred to as "command position SPX") of the coating head 302 on the X-axis in each control cycle in accordance with the target trajectory that is created in advance. The X-axis command generation module 140 outputs the generated command position SPX to the model predictive control module 142 and the Z-axis command generation module 150.

The X-axis command generation module 140 generates time series data of the command position SPX from the target trajectory, and reads the command position SPX of each control cycle from the time series data. Alternatively, the control device 100 may store in advance the time series data of the command position SPX that define the target trajectory. In this case, the X-axis command generation module 140 may access the time series data of the command position SPX stored in advance. In this way, the command position SPX for each control cycle may be sequentially calculated from the target trajectory in accordance with a predetermined calculation formula, or may be stored in advance in the form of time series data.

Based on the shape data 132 and the command position SPX, the Z-axis command generation module 150 generates the second command position (hereinafter referred to as "command position SPZ") of the coating head 302 on the Z-axis in each control cycle so that the distance between the coating head 302 and the surface of the workpiece W is constant. A specific method for generating the command position SPZ is to be described later.

By the model predictive control using the first dynamic characteristic model showing the relationship between the operation amount MVX and the position of the coating head 302 on the X-axis and the command position SPX, the model predictive control module 142 generates the operation amount MVX to be output to the servo driver 200X. The model predictive control module 142 generates the operation amount MVX so that the position of the coating head 302 on the X-axis coincides with the command position SPX.

By the model predictive control using the second dynamic characteristic model showing the relationship between the operation amount MVZ and the position of the coating head 302 on the Z-axis and the command position SPZ, the model predictive control module 152 generates the operation amount MVZ to be output to the servo driver 200Z so that the position of the coating head 302 on the Z-axis coincides with the command position SPZ.

The first dynamic characteristic model and the second dynamic characteristic model are created by prior tuning. A dynamic characteristic model is created based on an input value (operation amount) and an output value (measurement position of the coating head 302) obtained in the tuning.

The first dynamic characteristic model and the second dynamic characteristic model are expressed by, for example, a function $P(z^{-1})$ below. The function $P(z^{-1})$ is a discrete time transfer function in which a dead time element and an n-th order lag element are combined. In a dynamic characteristic model expressed by the function $P(z^{-1})$, dead time d as the dead time element as well as variables a1 to $a_n$ and variables $b_1$ to $b_m$ as the n-th order lag element are determined as model parameters. The dead time is a time (that is, delay time from input to output) from when an input value is given until when an output corresponding to the input value appears. The optimum values may also be determined for the order n and the order m.

$$P(z^{-1}) = z^{-d} \frac{b_1 z^{-1} + b_2 z^{-2} + \ldots + b_m z^{-m}}{1 + a_1 z^{-1} + a_2 z^{-2} + \ldots + a_n z^{-n}} \quad \text{[Expression 1]}$$

Such model parameter creation processing (that is, system identification) may be executed by the least squares method or the like.

Specifically, each value of the model parameters defining the first dynamic characteristic model is determined so that an output y when the operation amount MVX is given to the variable u of $y=P(z^{-1})*u$ coincides with the measurement position of the coating head 302 on the X-axis (that is, to minimize the error). Similarly, each value of the model parameters defining the second dynamic characteristic model is determined so that the output y when the operation amount MVZ is given to the variable u of $y=P(z^{-1})*u$ coincides with the measurement position of the coating head 302 on the Z-axis (that is, to minimize the error).

In the case where vibration of the coating head 302 is negligibly small, the position of the coating head 302 on the X-axis and the position of the servomotor 304X have a one-to-one relationship. Hence, a dynamic characteristic model showing the relationship between the position of the operation amount MVX and the position of the servomotor 304X may also be used as the first dynamic characteristic model. Similarly, in the case where vibration of the coating head 302 is negligibly small, the position of the coating head 302 on the Z-axis and the position of the servomotor 304Z have a one-to-one relationship. Hence, a dynamic characteristic model showing the relationship between the position of the operation amount MVZ and the position of the servomotor 304Z may also be used as the second dynamic characteristic model.

Model predictive control is a control for generating an operation amount so that the position of the control object (here, the coating head 302) in a prediction horizon coincides with the target trajectory. For example, a change amount of control amount of the control object required for causing the position of the control object in the prediction horizon to coincide with the target trajectory is determined, and an operation amount for generating the change amount in the output of a dynamic characteristic model is calculated. A known method may be adopted as the model predictive control.

D. Specific Example of Generation of Command Position SPZ

Figure 5:
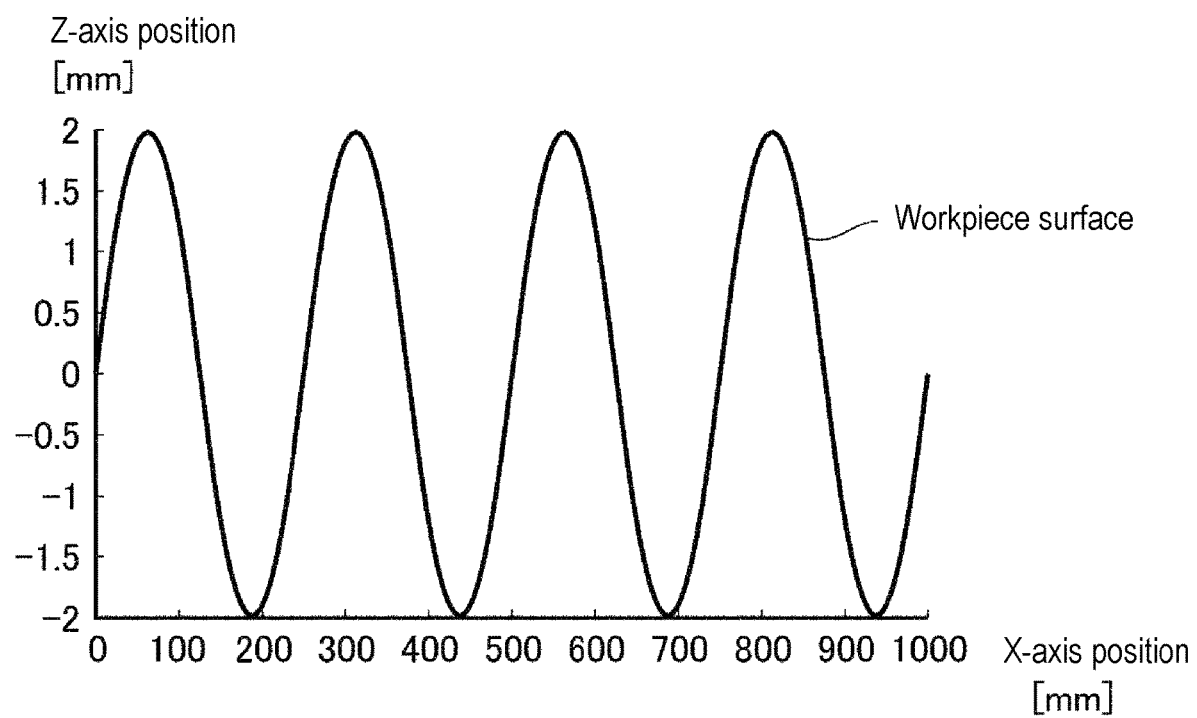
FIG. 5 illustrates one example of the surface shape of a workpiece W.
Figure 7:
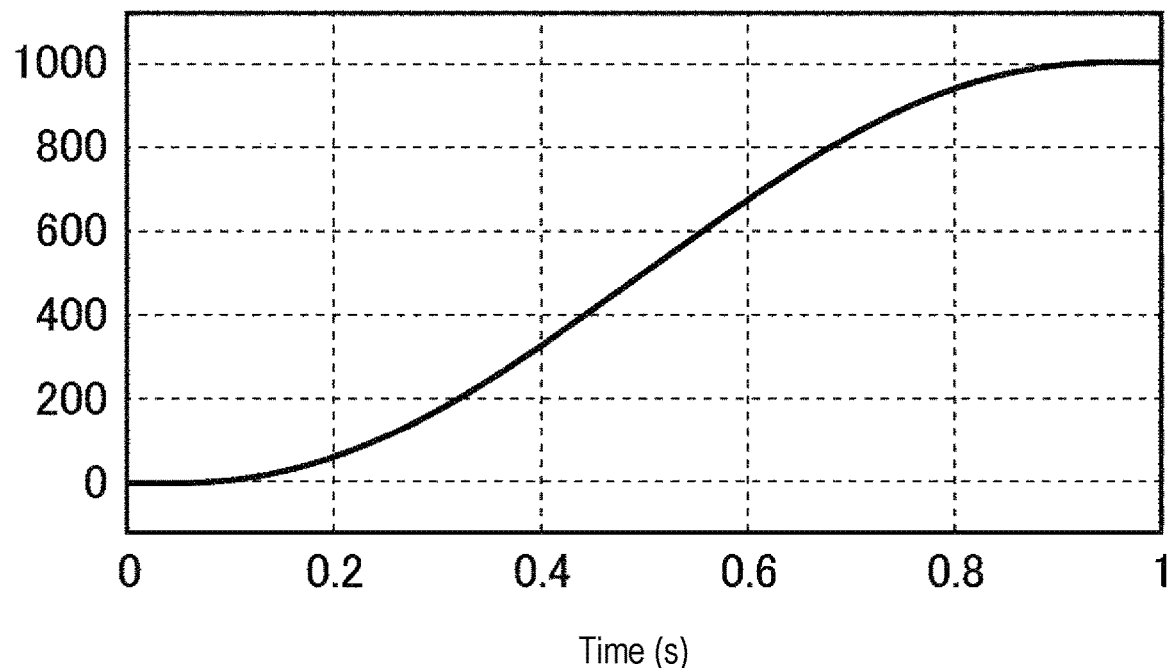
FIG. 7 illustrates one example of temporal change in a command position SPX.
Figure 8:
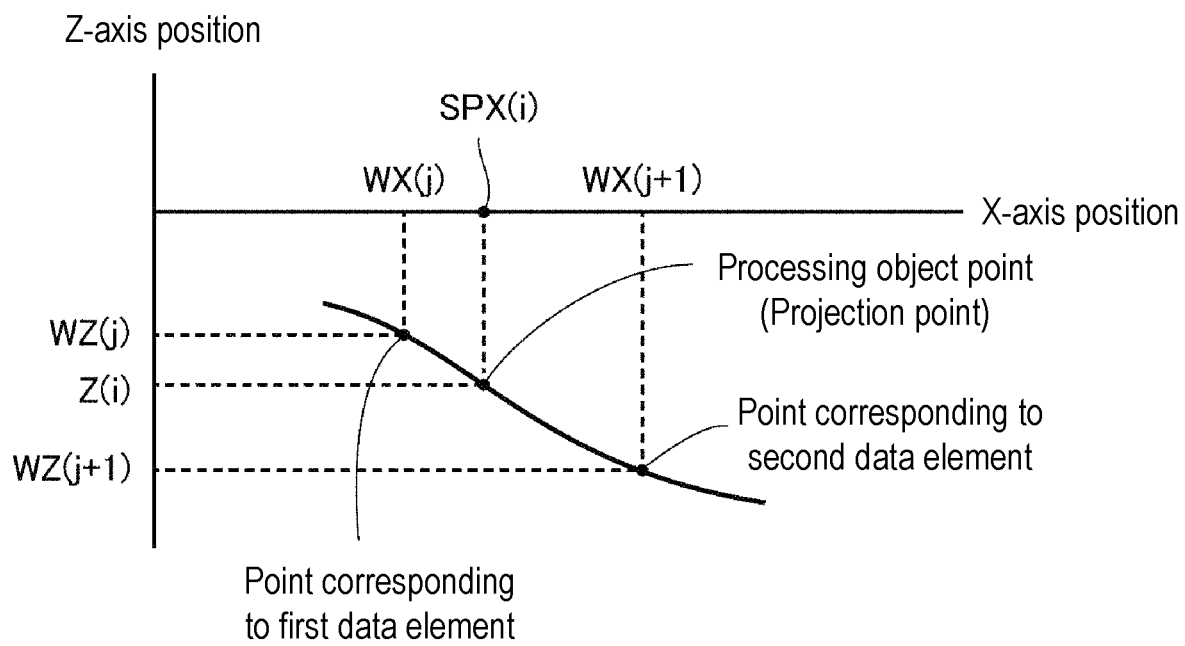
FIG. 8 describes a method for generating a command position SPZ by interpolation calculation.
Figure 9:
FIG. 9 illustrates one example of time series data of the command position SPX and the command position SPZ.
Figure 10:
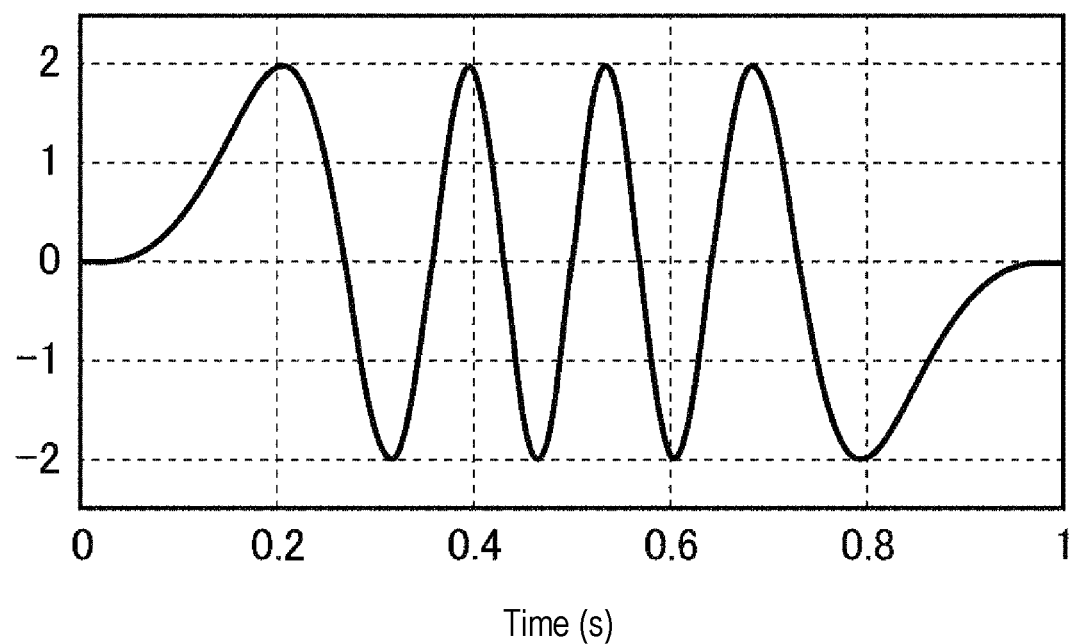
FIG. 10 illustrates one example of temporal change in the command position SPZ.

Referring to FIG. 5 to FIG. 10, a specific example of generation of the command position SPZ is described. FIG. 5 illustrates one example of the surface shape of the workpiece W. FIG. 6 illustrates one example of shape data of the surface of the workpiece W. FIG. 7 illustrates one example of temporal change in the command position SPX. FIG. 8 describes a method for generating the command position SPZ by interpolation calculation. FIG. 9 illustrates one example of time series data of the command position SPX and the command position SPZ. FIG. 10 illustrates one example of temporal change in the command position SPZ.

FIG. 5 shows the surface shape of the workpiece W having a length of 1000 mm in the X-axis direction. As shown in FIG. 5, the surface of the workpiece W is undulating in a wave-like manner along the X-axis direction.

FIG. 6 shows one example of the shape data 132 obtained by measuring the surface shape of the workpiece W shown in FIG. 5 by the shape measurement sensor 3. As shown in FIG. 6, the shape data 132 include a data element 134 of each of multiple points on the line obtained by projecting the X-axis on the surface of the workpiece W. The multiple points are at equal intervals (1 mm) along the X-axis direction. The data element 134 indicates a position (hereinafter referred to as "X-axis position") on the X-axis of the foot of a perpendicular drawn from a corresponding point on the surface of the workpiece W to the X-axis, and a position (hereinafter referred to as "Z-axis position") on the Z-axis of the foot of a perpendicular drawn from the aforementioned point to the Z-axis. The X-axis position is shown with reference to the foot of a perpendicular drawn from one end of the line obtained by projecting the X-axis on the surface of the workpiece W to the X-axis. The Z-axis position is shown with reference to a position separated by a predetermined distance along the Z-axis from an upper surface of the conveyance belt of the conveyance device 2.

As shown in FIG. 7, the X-axis command generation module 140 generates the time series data of the command position SPX for each control cycle from the target trajectory being, for example, a fifth order trajectory.

Based on the shape data 132 shown in FIG. 6, the Z-axis command generation module 150 generates the command position SPZ corresponding to the command position SPX for each control cycle. Hereinafter, the command position SPX of an i-th control cycle will be referred to as command position SPX(i), and the command position SPZ of the i-th control cycle will be referred to as command position SPZ(i).

The Z-axis command generation module 150 selects, from among the shape data 132, a first data element and a second data element respectively corresponding to two points sandwiching a processing object point on the surface of the workpiece W to be subjected to coating when the coating head 302 is located in the command position SPX(i). In the present embodiment, the servo driver 200X controls the servomotor 304X so that a coating liquid ejection port of the coating head 302 is located in a command position. Further, it is assumed that the coating liquid is ejected from the coating liquid ejection port in the Z-axis direction. In this case, a projection point of the command position SPX(i) on the surface of the workpiece W serves as the processing object point when the coating head 302 is located in the command position SPX(i). Hence, as shown in FIG. 8, the Z-axis command generation module 150 selects, from among the shape data 132, the first data element that indicates the same position as the command position SPX(i) or the X-axis position on one side (for example, negative side) of the command position SPX(i) and closest to the command position SPX(i). Further, the Z-axis command generation module 150 selects, from among the shape data 132, the second data element that indicates the X-axis position on one side (for example, positive side) of the command position SPX and closest to the command position SPX(i).

Depending on a relationship between the command position SPX and the position of the coating liquid ejection port of the coating head 302 or the coating direction, the projection point of the command position SPX(i) on the surface of the workpiece W may not coincide with the processing object point when the coating head 302 is located in the command position SPX(i). In such a case, considering a difference between the projection point and the processing object point, the first data element and the second data element respectively corresponding to the two points sandwiching the processing object point are selected from among the shape data 132.

By interpolation calculation using the selected first data element and second data element, the Z-axis command generation module 150 calculates a position Z(i) on the Z-axis of the foot of a perpendicular drawn from the projection point of the command position SPX(i) on the surface of the workpiece W to the Z-axis in accordance with, for example, [Expression 2] below.

$$Z(i) = WZ(j) + \frac{\{WZ(j+1) - WZ(j)\}}{\{WX(j+1) - WX(j)\}} \times \{SPX(i) - WX(j)\} \quad \text{[Expression 2]}$$

In [Expression 2], WX(j) indicates the X-axis position indicated by the first data element. WZ(j) indicates the Z-axis position indicated by the first data element. WX(j+1) indicates the X-axis position indicated by the second data element. WZ(j+1) indicates the Z-axis position indicated by the second data element (see FIG. 8).

Based on the position Z(i) on the Z-axis of the foot of the perpendicular drawn from the processing object point (the projection point of the command position SPX(i) on the surface of the workpiece W) to the Z-axis obtained as above, the Z-axis command generation module 150 generates the command position SPZ(i). Specifically, the Z-axis command generation module 150 may generate, as the command position SPZ(i), a position separated from the position Z(i) by a constant distance in the Z-axis direction. The constant distance is set according to a desired clearance in the Z-axis direction between the surface of the workpiece W and the coating head 302. In the following, to simplify the description, a case where the desired clearance is set to 0 (that is, a case where the position Z(i) is taken as the command position SPZ(i)) is described.

FIG. 9 shows the time series data of the command position SPZ for each control cycle (1 ms) generated by the above calculation. In the examples shown in FIG. 6 and FIG. 9, for example, for the control cycle of data No. 501, the command position SPZ is generated as follows. The Z-axis command generation module 150 selects, as the first data element, a data element 134a (see FIG. 6) indicating the X-axis position on the negative side of the command position SPX and closest to the command position SPX. Further, the Z-axis command generation module 150 selects, as the second data element, a data element 134b (see FIG. 6) indicating the X-axis position on the positive side of the command position SPX and closest to the command position SPX. By interpolation calculation using the selected data elements 134a and 134b, the Z-axis command generation module 150 generates the command position SPZ in accordance with the above [Expression 2].

FIG. 10 shows a graph of the time series data of the command position SPZ shown in FIG. 9. By moving the coating head 302 in the X-axis direction in accordance with the command position SPX shown in FIG. 7, and moving the coating head 302 in the Z-axis direction in accordance with the command position SPZ shown in FIG. 10, the coating head 302 can be moved in accordance with the surface shape of the workpiece W.

E. Processing Procedure

Figure 11:
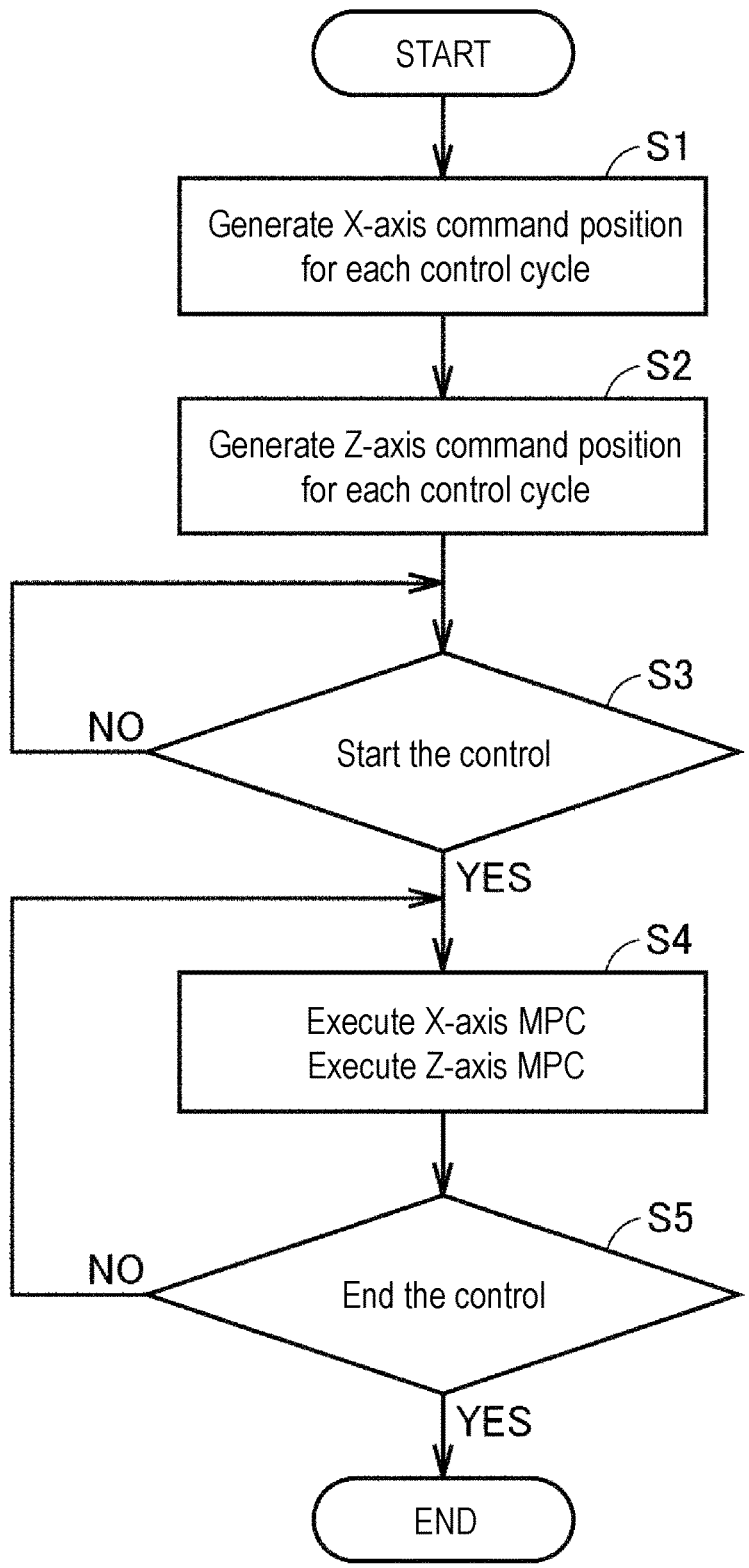
FIG. 11 is a flowchart showing a processing procedure of a control device according to the present embodiment.

Next, an outline of a processing procedure performed by the control device 100 according to the present embodiment is described. FIG. 11 is a flowchart showing a processing procedure of a control device according to the present embodiment. The steps shown in FIG. 11 may be realized by the processor 102 of the control device 100 executing a control program (including the system program 110 and the user program 112 shown in FIG. 2).

First, the control device 100 generates the command position SPX for each control cycle in accordance with a predetermined target trajectory (step S1).

Next, the control device 100 calculates the command position SPZ for each control cycle based on the shape data 132 and the command position SPX for each control cycle (step S2).

After that, the control device 100 determines whether to start the control (step S3). For example, the control device 100 may check the state of the servo drivers 200X and 200Z, the coating device 300 and other machines and receive a notification of completion of preparation from each machine, thereby determining to start movement control. If it is determined not to start the control (NO in step S3), the processing of the control device 100 is returned to step S3.

If it is determined to start the control (YES in step S3), in step S4, the control device 100 performs the model predictive control using the first dynamic characteristic model and the command position SPX, and calculates the operation amount MVX to be output to the servo driver 200X. Further, in step S4, the control device 100 performs the model predictive control using the second dynamic characteristic model and the command position SPZ, and calculates the operation amount MVZ to be output to the servo driver 200Z.

Next, the control device 100 determines whether the control should be ended (step S5). If the position of the coating head 302 reaches an end point of the target trajectory, the control device 100 may determine to end the control. If it is determined not to end the control (NO in step S5), the processing of the control device 100 is returned to step S4. Accordingly, step S4 is repeated every control cycle.

If it is determined to end the control (YES in step S5), the processing of the control device 100 is ended.

FIG. 12 illustrates a source code executed in step S2. In FIG. 12, j indicates a data number of the data element 134 in the shape data 132, and may take an integer of 0 to DNW. DNW indicates a maximum value of the number of the data element 134 in the shape data 132. js indicates a start number of j in a FOR statement. i indicates the number of a control cycle, and may take an integer of 0 to DNC. DNC indicates a maximum value of the data number in the time series data of the command position SPX generated from the target trajectory. X(i) indicates the command position SPX in the i-th control cycle. Z(i) indicates the position on the Z-axis of the foot of the perpendicular drawn from the projection point (processing object point) of the command position SPX on the surface of the workpiece W to the Z-axis, and is used as the command position SPZ in the i-th control cycle.

FIG. 12 shows a source code in the case of moving the coating head 302 in one direction along the X-axis. Hence, when calculating the command position SPZ(i) in the i-th control cycle, among the data elements 134 included in the shape data 132, the data elements before a data element used in calculating a command position SPZ(i−1) in an (i−1)-th control cycle is not used. Therefore, the first data element and the second data element are selected from among the data elements after the data element used in calculating the command position SPZ(i−1) in the (i−1)-th control cycle. Accordingly, calculation load is reduced as compared with the case where the first data element and the second data element are selected from among all the data elements.

F. Simulation Result

A simulation was performed to verify the effects of the control device 100 according to the present embodiment.

Figure 13:
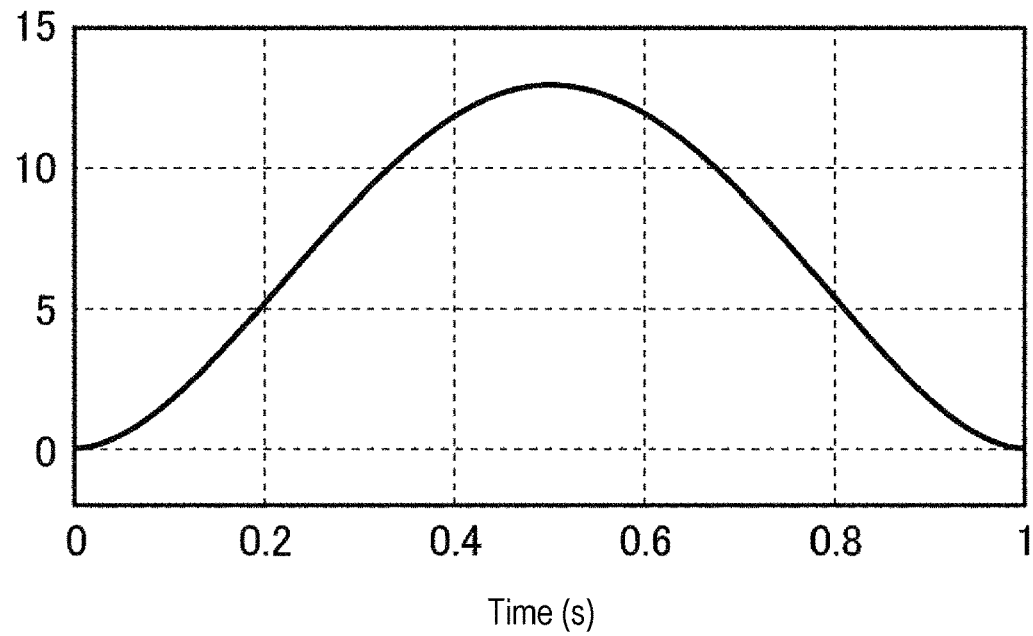
FIG. 13 illustrates an example of a simulation result when the command position SPX shown in FIG. 7 is given as a command value to a servo driver 200X.
Figure 14:
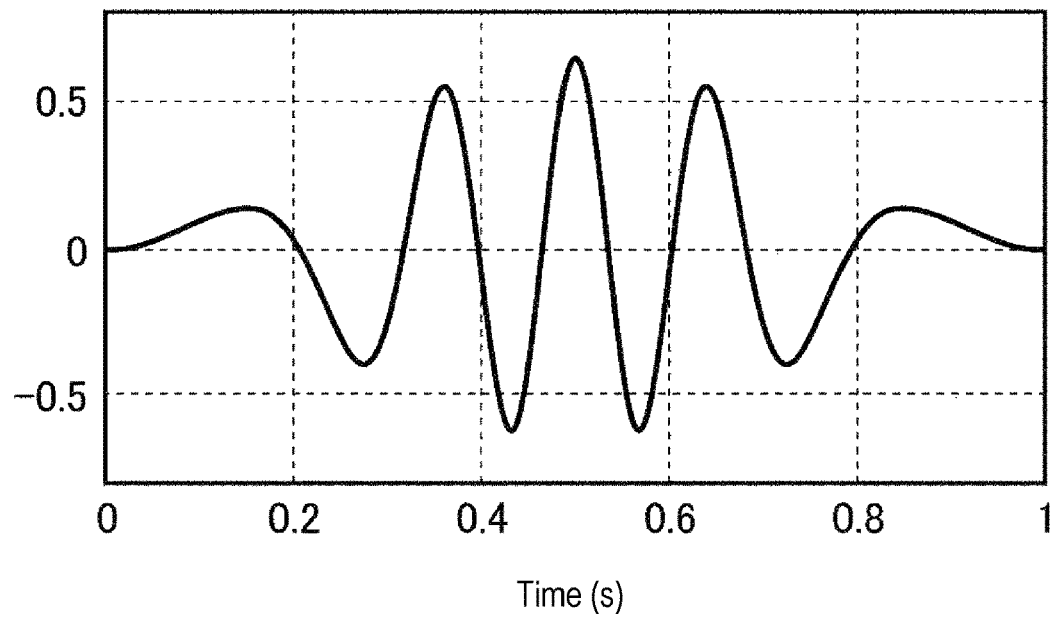
FIG. 14 illustrates an example of a simulation result when the command position SPZ shown in FIG. 10 is given as a command value to a servo driver 200Z.
Figure 15:
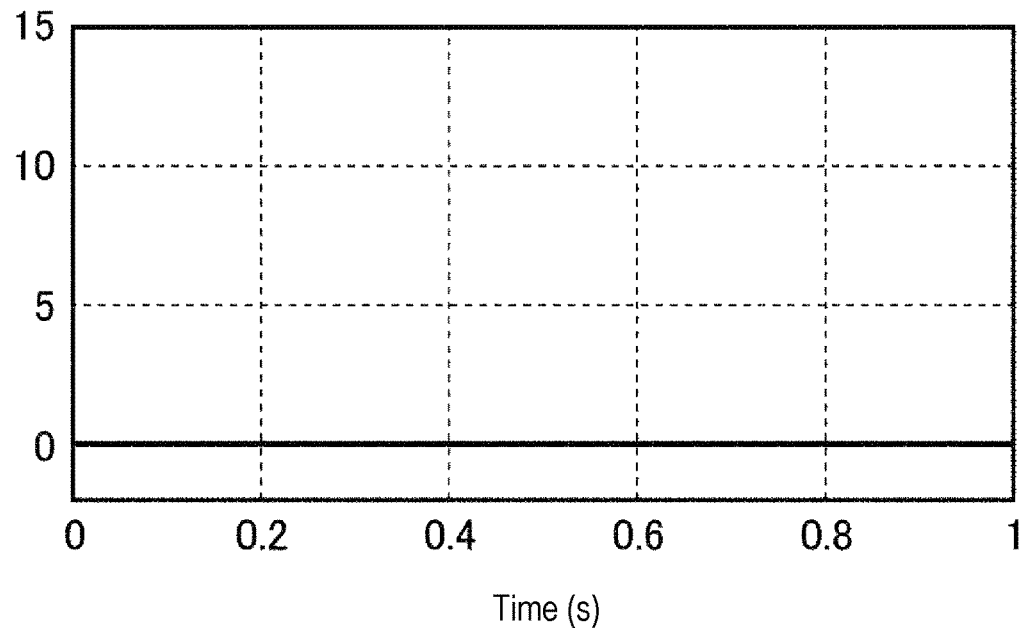
FIG. 15 illustrates an example of a simulation result when an operation amount MVX generated by model predictive control using the command position SPX shown in FIG. 7 and a first dynamic characteristic model is given to the servo driver 200X.
Figure 16:
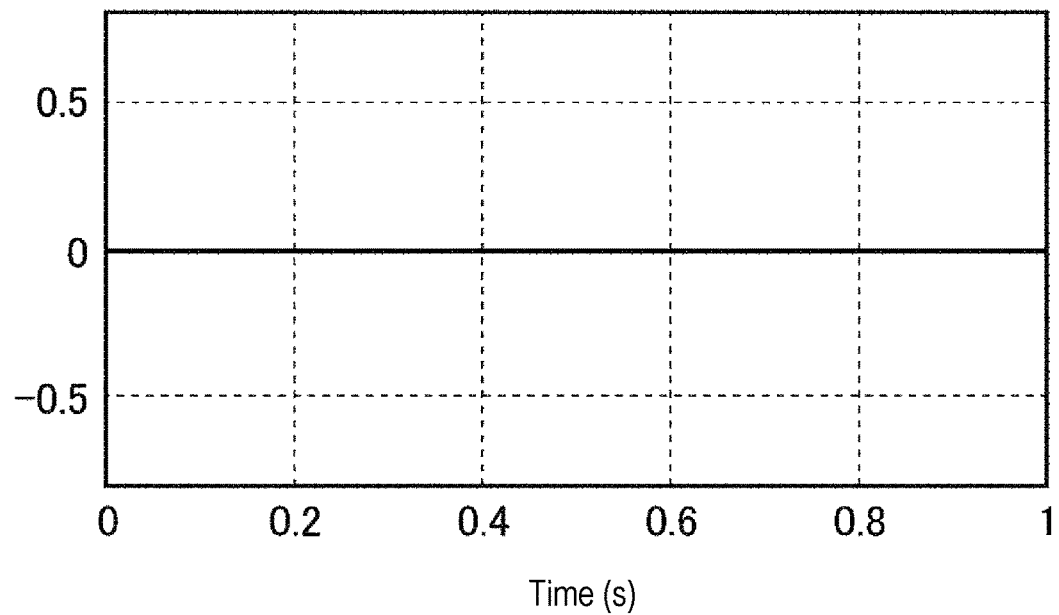
FIG. 16 illustrates an example of a simulation result when an operation amount MVZ generated by model predictive control using the command position SPZ shown in FIG. 10 and a second dynamic characteristic model is given to the servo driver 200Z.

FIG. 13 illustrates an example of a simulation result when the command position SPX shown in FIG. 7 is given as a command value to the servo driver 200X. FIG. 14 illustrates an example of a simulation result when the command position SPZ shown in FIG. 10 is given as a command value to the servo driver 200Z. FIG. 15 illustrates an example of a simulation result when the operation amount MVX (here, indicating command speed) generated by the model predictive control using the command position SPX shown in FIG. 7 and the first dynamic characteristic model is given to the servo driver 200X. FIG. 16 illustrates an example of a simulation result when the operation amount MVZ (here, indicating command speed) generated by the model predictive control using the command position SPZ shown in FIG. 10 and the second dynamic characteristic model is given to the servo driver 200Z. FIG. 13 to FIG. 16 show simulation results when the surface of the workpiece W has the shape shown in FIG. 5 and the control cycle is set to 1 ms. FIG. 15 and FIG. 16 show the simulation results when the prediction horizon is set to 6 ms.

FIG. 13 to FIG. 16 show a deviation between a command position and an actual position of the coating head 302. As shown in FIG. 13 and FIG. 14, if a command position is directly given as a command value to a servo driver without performing model predictive control, the position deviation increases when the moving speed is high. In contrast, as shown in FIG. 15 and FIG. 16, it is confirmed that the position deviation becomes substantially 0 by performing model predictive control.

Figure 17:
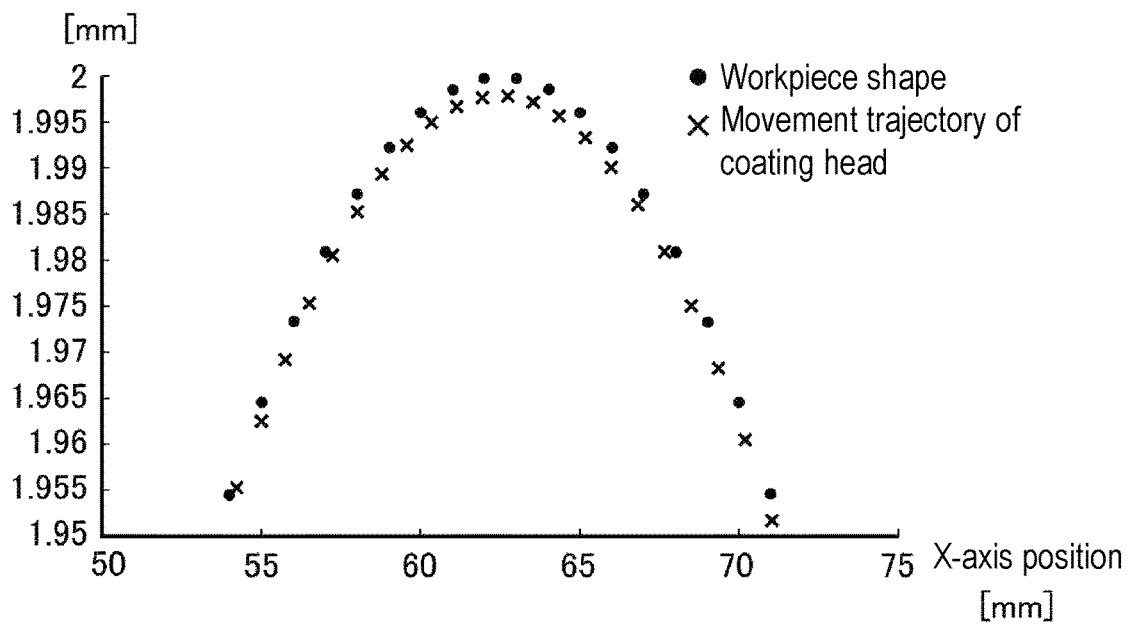
FIG. 17 illustrates a simulation result at X-axis positions of 50 mm to 75 mm in a movement trajectory of a coating head when the command positions shown in FIG. 7 and FIG. 10 are respectively given as command values to the servo drivers 200X and 200Z.
Figure 18:
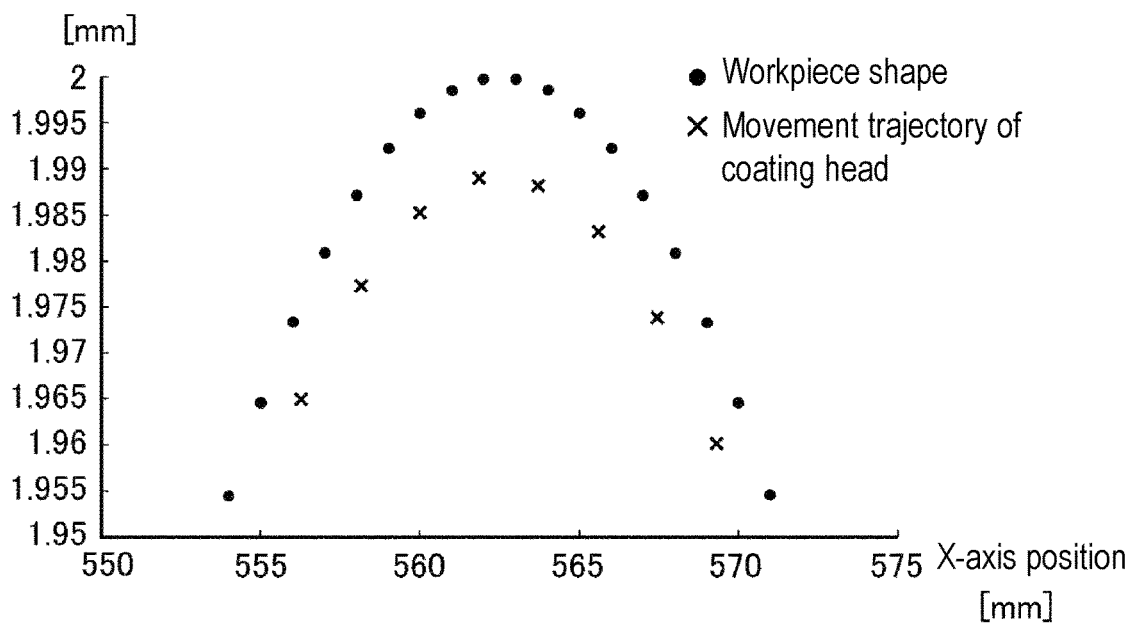
FIG. 18 illustrates a simulation result at X-axis positions of 550 mm to 575 mm in a movement trajectory of a coating head when the command positions shown in FIG. 7 and FIG. 10 are respectively given as command values to the servo drivers 200X and 200Z.
Figure 19:
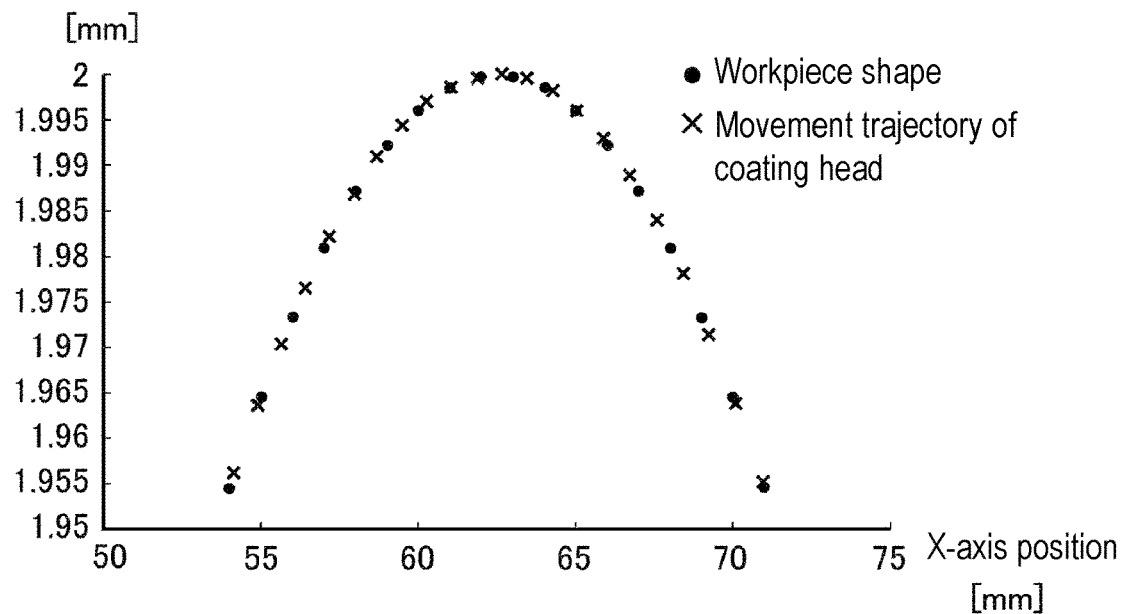
FIG. 19 illustrates a simulation result at X-axis positions of 50 mm to 75 mm in a movement trajectory of a coating head when the operation amounts MVX and MVZ generated by model predictive control are respectively given to the servo drivers 200X and 200Z.
Figure 20:
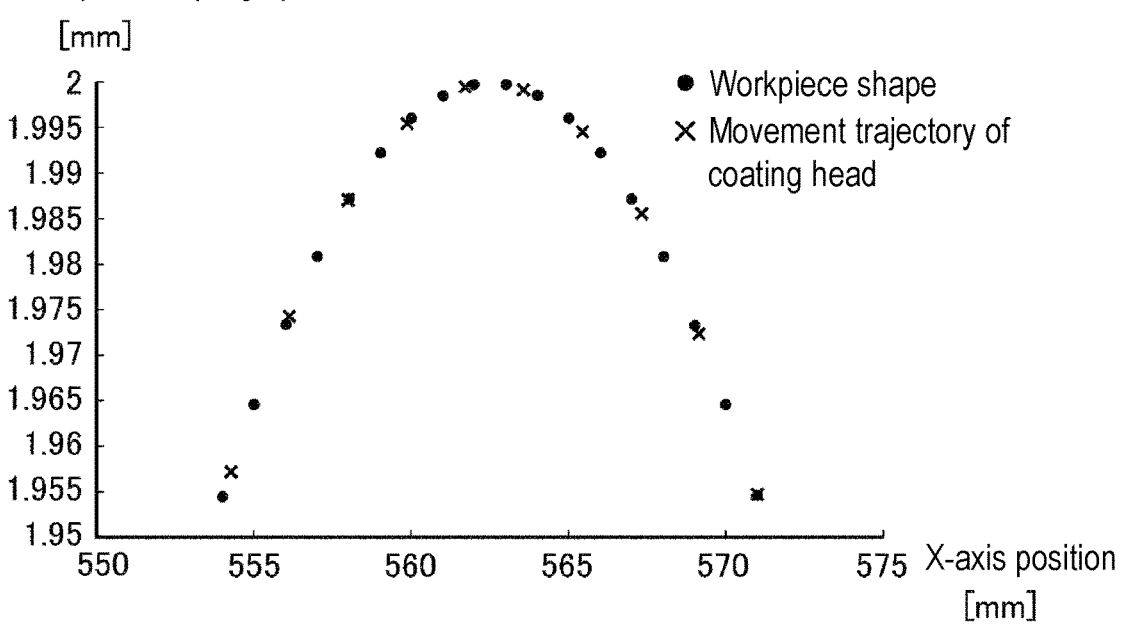
FIG. 20 illustrates a simulation result at X-axis positions of 550 mm to 575 mm in a movement trajectory of a coating head when the operation amounts MVX and MVZ generated by model predictive control are respectively given to the servo drivers 200X and 200Z.

FIG. 17 illustrates a simulation result at X-axis positions of 50 mm to 75 mm in a movement trajectory of a coating head when the command positions shown in FIG. 7 and FIG. 10 are respectively given as command values to the servo drivers 200X and 200Z. FIG. 18 illustrates a simulation result at X-axis positions of 550 mm to 575 mm in a movement trajectory of a coating head when the command positions shown in FIG. 7 and FIG. 10 are respectively given as command values to the servo drivers 200X and 200Z. FIG. 19 illustrates a simulation result at X-axis positions of 50 mm to 75 mm in a movement trajectory of a coating head when the operation amounts MVX and MVZ generated by model predictive control are respectively given to the servo drivers 200X and 200Z. FIG. 20 illustrates a simulation result at X-axis positions of 550 mm to 575 mm in a movement trajectory of a coating head when the operation amounts MVX and MVZ generated by model predictive control are respectively given to the servo drivers 200X and 200Z. FIG. 17 to FIG. 20 also show the shape of the workpiece W together with the movement trajectory of the coating head 302. A simulation was performed with the desired clearance between the surface of the workpiece W and the coating head 302 in the Z-axis direction as 0.

As shown in FIG. 17 and FIG. 18, if a command position is directly given as a command value to a servo driver without performing model predictive control, there is a gap between the workpiece shape and the movement trajectory of the coating head 302. In contrast, as shown in FIG. 19 and FIG. 20, by performing model predictive control, the gap between the workpiece shape and the movement trajectory of the coating head 302 is significantly reduced, and the coating head 302 moves in accordance with the shape of the surface of the workpiece W.

G. Advantages

As described above, the control device 100 according to the present embodiment includes the X-axis command generation module 140, the model predictive control module 142, the Z-axis command generation module 150, and the model predictive control module 152. Based on the target trajectory, the X-axis command generation module 140 generates the command position SPX of the coating head 302 on the X-axis in each control cycle. By the model predictive control using the first dynamic characteristic model showing the relationship between the operation amount MVX to be output to the servo driver 200X and the position of the coating head 302 on the X-axis and the command position SPX, the model predictive control module 142 generates the operation amount MVX. The Z-axis command generation module 150 generates the command position SPZ of the coating head 302 on the Z-axis in each control cycle. By the model predictive control using the second dynamic characteristic model showing the relationship between the operation amount MVZ to be output to the servo driver 200Z and the position of the coating head 302 on the Z-axis and the command position SPZ, the model predictive control module 152 generates the operation amount MVZ. Based on the shape data 132 indicating the surface shape of the workpiece W and the command position SPX, the Z-axis command generation module 150 generates the command position SPZ so that the distance between the coating head 302 and the surface of the workpiece W is constant.

The control device 100 of the above configuration performs movement control on the coating head 302 by model predictive control. At this time, the command position SPZ on the Z-axis in each control cycle is generated based on shape data. As a result, the coating head 302 is able to accurately follow the shape of the surface of the workpiece W.

With respect to each of multiple points on the line obtained by projecting the X-axis on the surface of the workpiece W, the shape data 132 indicate the position on the Z-axis of the foot of a perpendicular drawn from the aforementioned point to the Z-axis. The Z-axis command generation module 150 selects, from among the above multiple points, two points sandwiching the processing object point on the surface of the workpiece W to be subjected to coating when the coating head 302 is located in the command position SPX. By interpolation calculation using positions of the selected two points on the Z-axis, the Z-axis command generation module 150 obtains the position on the Z-axis of the foot of the perpendicular drawn from a point obtained by projecting the command position SPX on the surface of the workpiece W to the Z-axis, and generates the command position SPZ based on the position on the Z-axis.

By the above configuration, even if the data of the processing object point when the coating head 302 is located in the command position SPX is not included in the shape data 132, by interpolation calculation, the position on the Z-axis of the foot of the perpendicular drawn from the processing object point to the Z-axis can be obtained. Then, based on the position on the Z-axis, the command position SPZ is generated. In this way, the command position SPZ corresponding to the command position SPX can be easily generated according to the surface shape of the workpiece W.

H. Modifications

H-1. First Modification

In the above description, it is assumed that the coating device 300 includes the servomotor 304X that moves the coating head 302 along the X-axis on the XY plane facing the surface of the workpiece W. However, the coating device 300 may include, instead of the servomotor 304X, a servomotor that rotates the coating head 302 along the XY plane about a reference axis orthogonal to the XY plane. In this case, the control system 1 includes, instead of the servo driver 200X, a servo driver that drives the aforementioned servomotor. Further, the control device 100 may include, instead of the X-axis command generation module 140, a command generation module that generates a command angle with respect to the reference axis. The control device 100 may include, instead of the model predictive control module 142, a model predictive control module that generates an operation amount to be output to a servo driver by model predictive control using a dynamic characteristic model showing a relationship between the operation amount and a rotation position of the coating head 302 and the command angle.

H-2. Second Modification

In the above description, it is assumed that the shape measurement sensor 3 is a two-dimensional laser displacement sensor and measures the Z-axis positions of multiple points at equal intervals on the surface of the workpiece W along the X-axis direction. In this case, as shown in FIG. 6, the X-axis positions indicated by multiple data elements included in the shape data 132 are at equal intervals.

However, a one-dimensional laser displacement sensor may also be used as the shape measurement sensor 3. In this case, the Z-axis positions of multiple points on the surface of the workpiece W are measured while the shape measurement sensor 3 is moved in the X-axis direction in the same manner as the coating head 302. The shape measurement sensor 3 is preferably moved in the X-axis direction along the same target trajectory as the coating head 302. Accordingly, the interval between the X-axis positions indicated by the multiple data elements included in the shape data 132 substantially coincides with the interval between the time series data of the command position SPX. Hence, the Z-axis command generation module 150 may, for each control cycle, select from among the shape data a data element corresponding to a point closest to the processing object point when the coating head 302 is located in the command position SPX of the aforementioned control cycle. For example, the Z-axis command generation module 150 selects for each control cycle a data element indicating the X-axis position closest to the command position SPX from among the shape data. The Z-axis command generation module 150 may generate the Z-axis position indicated by the selected data element as the command position SPZ of the control cycle. In this way, there is no need for the Z-axis command generation module 150 to perform the interpolation calculation in accordance with the above [Expression 2]. As a result, calculation load on the Z-axis command generation module 150 is reduced.

H-3. Third Modification

In the above description, it is assumed that in the coating device 300, the coating head 302 is moved only along the X-axis on the XY plane facing the surface of the workpiece W. However, the coating device 300 may further include a servomotor that moves the coating head 302 along the Y-axis on the XY plane facing the surface of the workpiece W.

Figure 21:
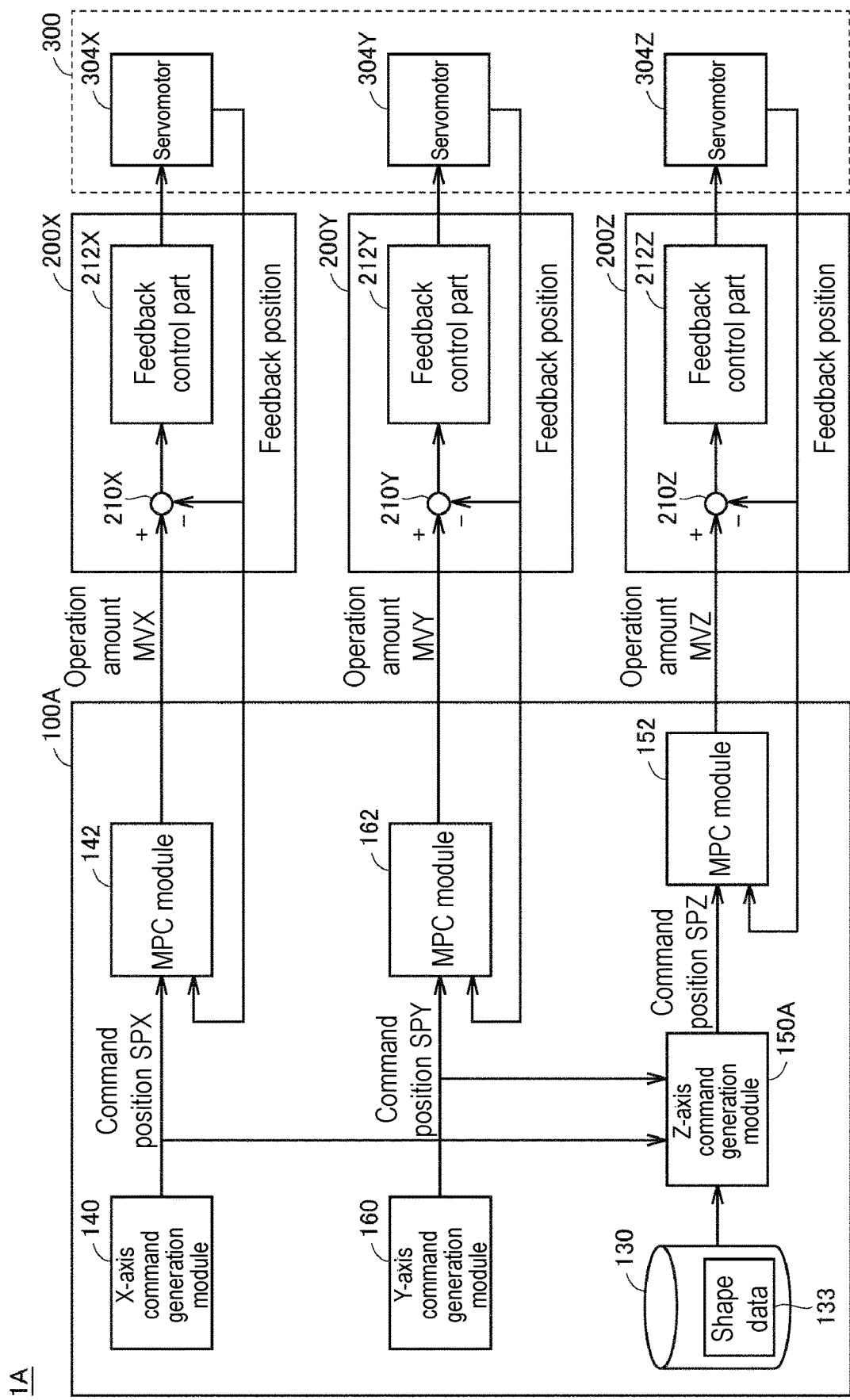
FIG. 21 is a schematic diagram showing one example of a functional configuration of a control system according to a third modification.

FIG. 21 is a schematic diagram showing one example of a functional configuration of a control system according to a third modification. As shown in FIG. 21, the coating device 300 includes a servomotor 304Y in addition to the servomotors 304X and 304Z. The servomotor 304Y moves the coating head 302 (see FIG. 1) in a Y-axis direction. Accordingly, the coating head 302 moves relative to the workpiece W along the Y-axis direction.

A control system 1A according to the third modification includes, in addition to the servo drivers 200X and 200Z, a servo driver 200Y for driving the servomotor 304Y.

The servo driver 200Y includes a subtractor 210Y and a feedback control part 212Y. The subtractor 210Y receives an operation amount MVY as the command value (command position or command speed) from a control device 100A, and also receives an output signal as the feedback value from an encoder coupled to the servomotor 304Y. The subtractor 210Y calculates a deviation between the command value and the feedback value. Similarly to the feedback control parts 212X and 212Z, the feedback control part 212Y executes a control operation according to the deviation output from the subtractor 210Y.

The control system 1A according to the third modification includes the control device 100A instead of the control device 100. Compared to the control device 100, the control device 100A includes a Z-axis command generation module 150A instead of the Z-axis command generation module 150, and differs from the control device 100 by further including a Y-axis command generation module 160 and a model predictive control module 162. Further, the storage 130 stores shape data 133 instead of the shape data 132.

The Y-axis command generation module 160 generates a third command position (hereinafter referred to as "command position SPY") of the coating head 302 on the Y-axis in each control cycle in accordance with the target trajectory that is created in advance. The Y-axis command generation module 160 outputs the generated command position SPY to the model predictive control module 162.

The Y-axis command generation module 160 generates time series data of the command position SPY from the target trajectory, and reads the command position SPY of each control cycle from the time series data. Alternatively, the control device 100A may store in advance the time series data of the command position SPY that define the target trajectory. In this case, the Y-axis command generation module 160 may access the time series data of the command position SPY stored in advance. In this way, the command position SPY for each control cycle may be sequentially calculated from the target trajectory in accordance with a predetermined calculation formula, or may be stored in advance in the form of time series data.

By model predictive control using a third dynamic characteristic model showing a relationship between the operation amount MVY and the position of the coating head 302 on the Y-axis and the command position SPY, the model predictive control module 162 generates the operation amount MVY to be output to the servo driver 200Y. The third dynamic characteristic model is created by the same method as the first dynamic characteristic model.

Figure 22:
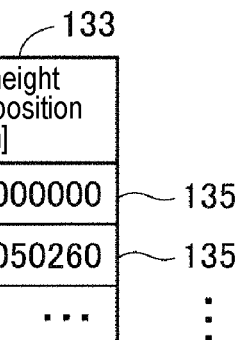
FIG. 22 illustrates one example of shape data in the third modification.

FIG. 22 illustrates one example of shape data in the third modification. The shape data 133 include a data element 135 of each of multiple points arranged in a grid pattern on the surface of the workpiece W. The data element 135 indicates the X-axis position of the foot of the perpendicular drawn from a corresponding point on the surface of the workpiece W to the X-axis, a position (hereinafter referred to as "Y-axis position") on the Y-axis of the foot of a perpendicular drawn from the aforementioned point to the Y-axis, and the Z-axis position of the foot of a perpendicular drawn from the aforementioned point to the Z-axis.

Based on the shape data 133 and the command positions SPX and SPY, the Z-axis command generation module 150A generates the command position SPZ in each control cycle so that the distance between the coating head 302 and the surface of the workpiece W is constant.

Figure 23:
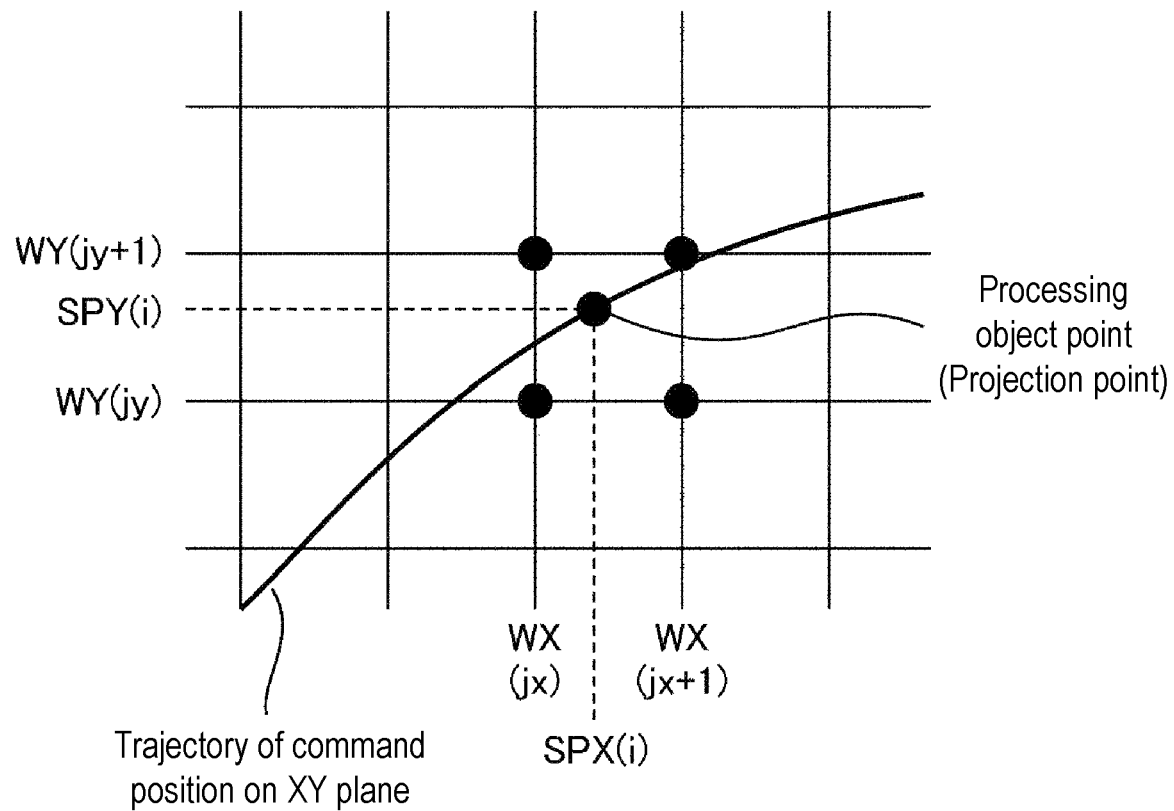
FIG. 23 describes a method for generating the command position SPZ in the third modification.

FIG. 23 describes a method for generating the command position SPZ in the third modification. The Z-axis command generation module 150A selects, from among the shape data 133, the data elements 135 corresponding to four points located around the processing object point on the surface of the workpiece W to be subjected to coating when the coating head 302 is located in the command position SPX and the command position SPY. Here, the servo drivers 200X and 200Y respectively control the servomotors 304X and 304Y so that the coating liquid ejection port of the coating head 302 is located in the command positions. Further, it is assumed that the coating liquid is ejected from the coating liquid ejection port in the Z-axis direction. In this case, a point (projection point) obtained by projecting a point on the XY plane indicated by the command positions SPX and SPY on the surface of the workpiece W along the Z-axis direction is the processing object point when the coating head 302 is located in the command positions SPX and SPY. Hence, the Z-axis command generation module 150A selects the data elements 135 corresponding to the four points located around the projection point. In the example shown in FIG. 23, the data elements 135 of four points whose (X-axis position, Y-axis position) are respectively (WX(jx), WY(jy)), (WX(jx+1), WY(jy)), (WX(jx), WY(jy+1)), and (WX(jx+1), WY(jy+1)) are selected.

By interpolation calculation using the selected data elements 135 of the four points, the Z-axis command generation module 150A calculates the position Z(i) on the Z-axis of the foot of a perpendicular drawn from the projection point (processing object point) to the Z-axis in accordance with, for example, [Expression 3] below. In [Expression 3], WZ(jx, jy) is the Z-axis position included in the data element of the point whose (X-axis position, Y-axis position) is (WX(jx), WY(jy)). WZ(jx+1, jy) is the Z-axis position included in the data element of the point whose (X-axis position, Y-axis position) is (WX(jx+1), WY(jy)). WZ(jx, jy+1) is the Z-axis position included in the data element of the point whose (X-axis position, Y-axis position) is (WX(jx), WY(jy+1)). WZ(jx+1, jy+1) is the Z-axis position included in the data element of the point whose (X-axis position, Y-axis position) is (WX(jx+1), WY(jy+1)).

$$Z(i) = \frac{(WX(jx+1) - SPX(i))}{(WX(jx+1) - WX(jx))} \times \frac{(WY(jy+1) - SPY(i))}{(WY(jy+1) - WY(jy))} \times WZ(jx, jy) +$$
$$\frac{(SPX(i) - WX(jx))}{(WX(jx+1) - WX(jx))} \times \frac{(WY(jy+1) - SPY(i))}{(WY(jy+1) - WY(jy))} +$$
$$WZ(jx+1, jy) + \frac{(WX(jx+1) - SPX(i))}{(WX(jx+1) - WX(jx))} \times \frac{(SPY(i) - WY(jy))}{(WY(jy+1) - WY(jy))} \times WZ(jx, jy+1) +$$
$$\frac{(SPX(i) - WX(jx))}{(WX(jx+1) - WX(jx))} \times \frac{(SPY(i) - WY(jy))}{(WY(jy+1) - WY(jy))} \times WZ(jx+1, jy+1)$$
[Expression 3]

Based on the position Z(i) on the Z-axis of the foot of the perpendicular drawn from the projection point (processing object point) to the Z-axis obtained as above, the Z-axis command generation module 150A generates the command position SPZ(i).

Although it is assumed that the data elements 135 of four points are selected from the shape data 133, the Z-axis command generation module 150A may also select the data elements 135 of the top three points close to the processing object point (here, the projection point). By interpolation calculation using the selected data elements of the three points, the Z-axis command generation module 150A calculates the position Z(i) on the Z-axis of the foot of a perpendicular drawn from the projection point of the command position SPX(i) on the surface of the workpiece W to the Z-axis.

H-4. Fourth Modification

In the above description, it is assumed that the storage 130 stores the shape data 132 and 133 measured by the shape measurement sensor 3. However, the storage 130 may also store shape data indicating the shape of the surface of the workpiece W that are generated from design data of the workpiece W. For example, in the case of the workpiece W having a surface with intentionally formed undulations thereon and having a negligibly small individual difference in the surface shape, the shape data generated from the design data can be used.

H-5. Fifth Modification

In the above description, it is assumed that the multiple servo drivers 200 move the coating head 302. However, the multiple servo drivers 200 may change the relative positional relationship between the workpiece W and the coating head 302. The multiple servo drivers 200 may be configured to move the workpiece W with the coating head 302 fixed. For example, the workpiece W may be placed on an XZ stage. In this case, the servo driver 200X moves the coating head 302 relative to the workpiece W along the X-axis direction by controlling movement of the XZ stage in the X-axis direction. The servo driver 200Z moves the coating head 302 relative to the workpiece W along the Z-axis direction by controlling movement of the XZ stage in the Z-axis direction. Alternatively, the workpiece W may be placed on an XYZ stage. In this case, the servo driver 200Y moves the coating head 302 relative to the workpiece W along the Y-axis direction by controlling movement of the XYZ stage in the Y-axis direction.

Alternatively, the servo driver 200X may control movement of one (for example, the coating head 302) of the coating head 302 and the workpiece W in the X-axis direction, and the servo driver 200Z may control movement of the other (for example, the workpiece W) of the coating head 302 and the workpiece W in the Z-axis direction. Further, the servo driver 200Y may control movement of either of the coating head 302 and the workpiece W in the Y-axis direction.

I. Additional Remark

As stated above, the present embodiment and the modifications include the following disclosures.

(Configuration 1)

A control device (100, 100A), connected to multiple drive devices (200, 200X, 200Y, 200Z) for changing a relative positional relationship between an object (W) and a control object (302) executing a predetermined processing on a surface of the object (W), outputting an operation amount to the multiple drive devices (200, 200X, 200Y, 200Z) every control cycle, the multiple drive devices (200, 200X, 200Y, 200Z) including a first drive device (200X) for moving the control object (302) relative to the object (W) along a plane facing the surface of the object (W) and a second drive device (200Z) for moving the control object (302) relative to the object (W) along an orthogonal axis orthogonal to the plane, wherein the control device (100, 100A) includes:

a first generator (140), generating a first command position of the control object (302) on the plane in each control cycle based on a target trajectory;

a first control part (142), generating a first operation amount output to the first drive device (200X) by model predictive control using a first dynamic characteristic model showing a relationship between the first operation amount and a position of the control object (302) on the plane and the first command position;

a second generator (150), generating a second command position of the control object (302) on the orthogonal axis in each control cycle; and a second control part (152), generating a second operation amount output to the second drive device (200Z) by model predictive control using a second dynamic characteristic model showing a relationship between the second operation amount and a position of the control object (302) on the orthogonal axis and the second command position, wherein based on shape data indicating a surface shape of the object (W) and the first command position, the second generator (150) generates the second command position so that a distance between the control object (302) and the surface of the object (W) is constant.

(Configuration 2)

The control device (100) as described in Configuration 1, wherein the first drive device (200X) moves the control object (302) relative to the object (W) along a first axis on the plane;

the first command position indicates a position on the first axis;

the first dynamic characteristic model indicates a relationship between the first operation amount and the position of the control object (302) on the first axis;

with respect to each of multiple points on a line obtained by projecting the first axis on the surface of the object (W), the shape data indicate a position on the orthogonal axis of the foot of a perpendicular drawn from the aforementioned point to the orthogonal axis;

the second generator (150)

selects, from among the multiple points, two points sandwiching a processing object point on the surface of the object (W) to be subjected to the predetermined processing when the control object (302) is located in the first command position, obtains a position on the orthogonal axis of the foot of a perpendicular drawn from the processing object point to the orthogonal axis by interpolation calculation using positions of the selected two points on the orthogonal axis, and generates the second command position based on a position of the processing object point on the orthogonal axis.

(Configuration 3)

The control device (100) as described in Configuration 1, wherein the first drive device (200X) moves the control object (302) relative to the object (W) along a first axis on the plane;

the first command position indicates a position on the first axis;

the first dynamic characteristic model indicates a relationship between the first operation amount and the position of the control object (302) on the first axis;

with respect to each of multiple points on a line obtained by projecting the first axis on the surface of the object, the shape data indicate a position on the orthogonal axis of the foot of a perpendicular drawn from the aforementioned point to the orthogonal axis;

the second generator (150)

selects, from among the multiple points, a point closet to a processing object point on the surface of the object (W) to be subjected to the predetermined processing when the control object (302) is located in the first command position, and generates the second command position based on a position of the selected point on the orthogonal axis.

(Configuration 4)

The control device (100A) as described in Configuration 1, wherein the first drive device (200X) moves the control object (302) relative to the object (W) along a first axis on the plane;

the first command position indicates a position on the first axis;

the first dynamic characteristic model indicates a relationship between the first operation amount and the position of the control object (302) on the first axis;

the multiple drive devices (200, 200X, 200Y, 200Z) further include a third drive device (200Y) for moving the control object (302) relative to the object (W) along a second axis on the plane that is different from the first axis;

the control device (100A) further includes:

a third generator (160), generating a third command position of the control object (302) on the second axis in each control cycle based on the target trajectory; and a third control part (162), generating a third operation amount output to the third drive device (200Y) by model predictive control using a third dynamic characteristic model showing a relationship between the third operation amount and the position of the control object (302) on the second axis and the third command position, wherein the second generator (150) generates the second command position based on the third command position in addition to the shape data and the first command position.

(Configuration 5)

The control device (100A) as described in Configuration 4, wherein with respect to each of multiple points on the surface of the object, the shape data indicate a position on the orthogonal axis of the foot of a perpendicular drawn from the aforementioned point to the orthogonal axis;

the second generator (150)

selects, from among the multiple points, at least three points located around a processing object point on the surface of the object (W) to be subjected to the predetermined processing when the control object (302) is located in the first command position and the third command position, obtains a position on the orthogonal axis of the foot of a perpendicular drawn from the processing object point to the orthogonal axis by interpolation calculation using positions of the selected at least three points on the orthogonal axis, and generates the second command position based on a position of the processing object point on the orthogonal axis.

(Configuration 6)

A control program for realizing a control device (100, 100A), the control device (100, 100A) being connected to multiple drive devices (200, 200X, 200Y, 200Z) for changing a relative positional relationship between an object (W) and a control object (302) executing a predetermined processing on a surface of the object (W), the control device outputting an operation amount to the multiple drive devices (200, 200X, 200Y, 200Z) every control cycle, the multiple drive devices (200, 200X, 200Y, 200Z) including a first drive device (200X) for moving the control object (302) relative to the object (W) along a plane facing the surface of the object (W) and a second drive device (200Z) for moving the control object (302) relative to the object (W) along an orthogonal axis orthogonal to the plane, wherein the control program causes a computer to execute:

a step of generating a first command position of the control object (302) on the plane in each control cycle based on a target trajectory;

a step of generating a first operation amount output to the first drive device (200X) by model predictive control using a first dynamic characteristic model showing a relationship between the first operation amount and a position of the control object (302) on the plane and the first command position;

a step of generating a second command position of the control object (302) on the orthogonal axis in each control cycle; and a step of generating a second operation amount output to the second drive device (200Z) by model predictive control using a second dynamic characteristic model showing a relationship between the second operation amount and a position of the control object (302) on the orthogonal axis and the second command position, wherein the step of generating the second command position includes a step of, based on shape data indicating a surface shape of the object (W) and the first command position, generating the second command position so that a distance between the control object (304) and the surface of the object (W) is constant.

Although the embodiments of the present invention have been described, the embodiments disclosed herein are illustrative in all aspects and should not be construed as being restrictive. The scope of the present invention is indicated by claims, and it is intended to include all modifications within the scope of the claims and the equivalents thereof.

What is claimed is:

1. A control device, connected to a plurality of servomotors configured to change a relative positional relationship between an object and a control object executing a predetermined processing on a surface of the object, outputting an operation amount to the plurality of servomotors every control cycle, the plurality of servomotors comprising a first servomotor configured to move the control object relative to the object along a plane facing the surface of the object and a second servomotor configured to move the control object relative to the object along an orthogonal axis orthogonal to the plane, wherein the control device comprises:

a first generator, configured to generate a first command position of the control object on the plane in each control cycle based on a target trajectory;

a first controller, configured to generate a first operation amount output to the first servomotor by model predictive control using a first dynamic characteristic model showing a relationship between the first operation amount and a position of the control object on the plane and the first command position;

a second generator, configured to generate a second command position of the control object on the orthogonal axis in each control cycle; and a second controller, configured to generate a second operation amount output to the second servomotor by model predictive control using a second dynamic characteristic model showing a relationship between the second operation amount and a position of the control object on the orthogonal axis and the second command position, wherein based on shape data indicating a surface shape of the object and the first command position, the second generator is configured to generate the second command position so that a distance between the control object and the surface of the object is constant.

2. The control device according to claim 1, wherein the first servomotor is configured to move the control object relative to the object along a first axis on the plane;

the first command position indicates a position on the first axis;

the first dynamic characteristic model indicates a relationship between the first operation amount and the position of the control object on the first axis;

with respect to each of a plurality of points on a line obtained by projecting the first axis on the surface of the object, the shape data indicate a position on the orthogonal axis of a foot of a perpendicular drawn from the point to the orthogonal axis;

the second generator configured to:

select, from among the plurality of points, two points sandwiching a processing object point on the surface of the object to be subjected to the predetermined processing when the control object is located in the first command position, obtain a position on the orthogonal axis of a foot of a perpendicular drawn from the processing object point to the orthogonal axis by interpolation calculation using positions of the selected two points on the orthogonal axis, and generate the second command position based on a position of the processing object point on the orthogonal axis.

3. The control device according to claim 1, wherein the first servomotor is configured to move the control object relative to the object along a first axis on the plane;

the first command position indicates a position on the first axis;

the first dynamic characteristic model indicates a relationship between the first operation amount and the position of the control object on the first axis;

with respect to each of a plurality of points on a line obtained by projecting the first axis on the surface of the object, the shape data indicate a position on the orthogonal axis of a foot of a perpendicular drawn from the point to the orthogonal axis;

the second generator configured to:

select, from among the plurality of points, a point closest to a processing object point on the surface of the object to be subjected to the predetermined processing when the control object is located in the first command position, and generate the second command position based on a position of the selected point on the orthogonal axis.

4. The control device according to claim 1, wherein the first servomotor is configured to move the control object relative to the object along a first axis on the plane;

the first command position indicates a position on the first axis;

the first dynamic characteristic model indicates a relationship between the first operation amount and the position of the control object on the first axis;

the plurality of servomotors further comprise a third servomotor configured to move the control object relative to the object along a second axis on the plane that is different from the first axis;

the control device further comprises:

a third generator, configured to generate a third command position of the control object on the second axis in each control cycle based on the target trajectory; and a third controller, configured to generate a third operation amount output to the third servomotor by model predictive control using a third dynamic characteristic model showing a relationship between the third operation amount and a position of the control object on the second axis and the third command position, wherein the second generator is configured to generate the second command position based on the third command position in addition to the shape data and the first command position.

5. The control device according to claim 4, wherein with respect to each of a plurality of points on the surface of the object, the shape data indicate a position on the orthogonal axis of a foot of a perpendicular drawn from the point to the orthogonal axis;

the second generator configured to:

select, from among the plurality of points, at least three points located around a processing object point on the surface of the object to be subjected to the predetermined processing when the control object is located in the first command position and the third command position, obtain a position on the orthogonal axis of a foot of a perpendicular drawn from the processing object point to the orthogonal axis by interpolation calculation using positions of the selected at least three points on the orthogonal axis, and generate the second command position based on a position of the processing object point on the orthogonal axis.

6. A non-transitory computer readable recording medium storing a control program for realizing a control device, the control device being connected to a plurality of servomotors configured to change a relative positional relationship between an object and a control object executing a predetermined processing on a surface of the object, the control device outputting an operation amount to the plurality of servomotors every control cycle, the plurality of servomotors comprising a first servomotor configured to move the control object relative to the object along a plane facing the surface of the object and a second servomotor configured to move the control object relative to the object along an orthogonal axis orthogonal to the plane, wherein the control program causes a computer to execute:

generating a first command position of the control object on the plane in each control cycle based on a target trajectory;

generating a first operation amount output to the first servomotor by model predictive control using a first dynamic characteristic model showing a relationship between the first operation amount and a position of the control object on the plane and the first command position;

generating a second command position of the control object on the orthogonal axis in each control cycle; and generating a second operation amount output to the second servomotor by model predictive control using a second dynamic characteristic model showing a relationship between the second operation amount and a position of the control object on the orthogonal axis and the second command position, wherein generating the second command position comprises, based on shape data indicating a surface shape of the object and the first command position, generating the second command position so that a distance between the control object and the surface of the object is constant.

* * * * *